United States Patent
Hirsch et al.

(10) Patent No.: US 9,686,009 B2
(45) Date of Patent: Jun. 20, 2017

(54) BROADBAND MULTIBEAM SATELLITE RADIO COMMUNICATION SYSTEM WITH IMPROVED REUSE OF FREQUENCIES ON THE FORWARD CHANNEL, AND ASSOCIATED METHOD FOR REUSE

(71) Applicant: THALES, Courbevoie (FR)

(72) Inventors: Antonin Hirsch, Toulouse (FR); Pierre Bosshard, Toulouse (FR); Didier Le Boulc'h, Toulouse (FR); Judicael Pressence, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/096,081

(22) Filed: Apr. 11, 2016

(65) Prior Publication Data
US 2016/0308603 A1    Oct. 20, 2016

(30) Foreign Application Priority Data

Apr. 15, 2015  (FR) ..................... 15 00785

(51) Int. Cl.
*H04B 7/185*    (2006.01)
*H04B 7/204*    (2006.01)
(Continued)

(52) U.S. Cl.
CPC ..... *H04B 7/18543* (2013.01); *H04B 7/18515* (2013.01); *H04B 7/18539* (2013.01);
(Continued)

(58) Field of Classification Search
CPC ............ H04B 7/18543; H04B 7/18563; H04B 7/18582; H04B 7/18515; H04B 7/2041;
(Continued)

(56) References Cited

U.S. PATENT DOCUMENTS

| | | |
|---|---|---|
| 2011/0053628 A1 | 3/2011 | Kim et al. |
| 2012/0034915 A1 | 2/2012 | Arcidiacono et al. |
| 2014/0045421 A1* | 2/2014 | Miller ............... H04B 7/18513 455/12.1 |

FOREIGN PATENT DOCUMENTS

| | | |
|---|---|---|
| EP | 2 099 142 A2 | 9/2009 |
| EP | 2 434 578 A1 | 3/2012 |

OTHER PUBLICATIONS

O. Vidal et al., "Fractional Frequency Reuse in fixed Broadband High Throughput Satellite systems," Proceedings of 31st AIAA International Communication Satellite Systems Conference, Oct. 14-17, 2013, Florence, Italy.

(Continued)

*Primary Examiner* — Inder Mehra
(74) *Attorney, Agent, or Firm* — Baker & Hostetler LLP

(57) ABSTRACT

A broadband multibeam satellite radio communication system is configured to cover a geographical service area that is broken down into a plurality of transmission spots that are each made up of a central internal area and a peripheral area. A first polarization state and a second polarization state are respectively allocated to the spots of a first grid G1 and the spots of the second grid G2. One and the same main band BP of frequencies is allocated wholly to each central internal area. The coverage of the quadruple points service area is a pavement of elemental useful surfaces or coverage meshes having the shape of a parallelogram.

23 Claims, 11 Drawing Sheets

(51) Int. Cl.
  *H04W 16/28* (2009.01)
  *H04W 72/04* (2009.01)
  *H04W 72/08* (2009.01)

(52) U.S. Cl.
  CPC ..... *H04B 7/18563* (2013.01); *H04B 7/18582* (2013.01); *H04B 7/2041* (2013.01); *H04W 16/28* (2013.01); *H04W 72/048* (2013.01); *H04W 72/082* (2013.01)

(58) Field of Classification Search
  CPC  H04B 7/18539; H04W 72/08; H04W 72/082; H04W 72/085; H04W 16/28; H04W 72/04
  USPC ...... 455/12.1, 13.4, 427, 428, 429; 342/353, 342/354, 367
  See application file for complete search history.

(56) References Cited

OTHER PUBLICATIONS

Ng et al., "Interference coordination for the return link of a multibeam satellite system," 2014 IEEE 7th Advanced Satellite Multimedia Systems Conference and the 13th Signal Processing for Space Communications Workshop, Sep. 8, 2014, pp. 366-373, XP032668136.

* cited by examiner

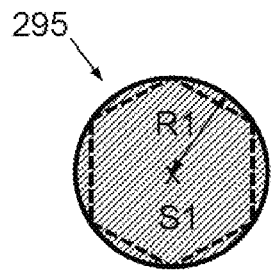 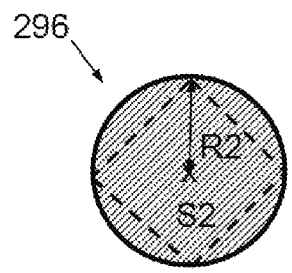
FIG.8A    FIG.8B
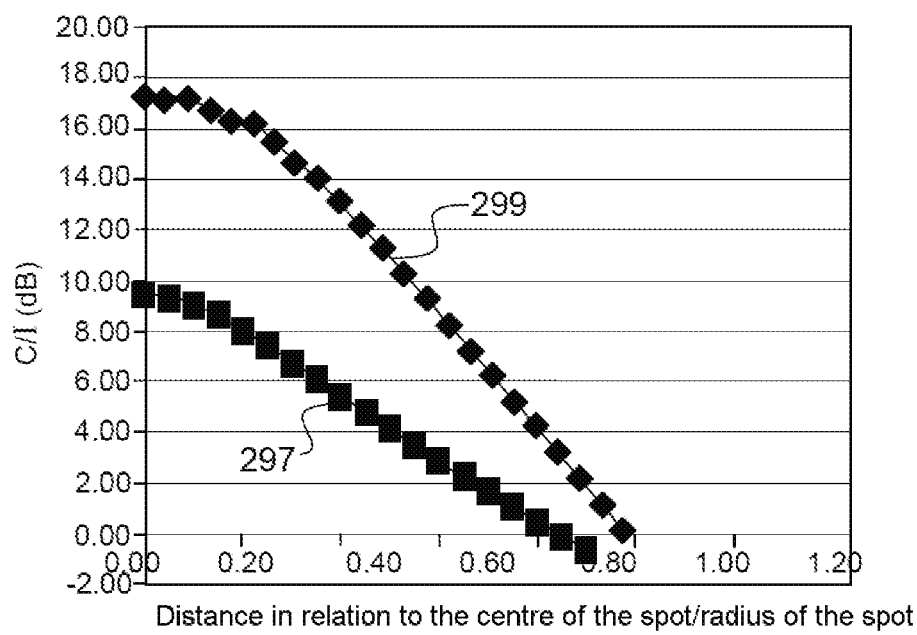
FIG.9

BROADBAND MULTIBEAM SATELLITE RADIO COMMUNICATION SYSTEM WITH IMPROVED REUSE OF FREQUENCIES ON THE FORWARD CHANNEL, AND ASSOCIATED METHOD FOR REUSE

CROSS-REFERENCE TO RELATED APPLICATION

This application claims priority to foreign French patent application No. 1500785, filed on Apr. 15, 2015, the disclosure of which is incorporated by reference in its entirety.

FIELD OF THE INVENTION

The present invention concerns a high-capacity broadband multibeam satellite radio communication system that is configured for fractional or complete reuse of frequencies in the forward channel and a corresponding method for improved reuse of frequencies.

Current second-generation high-speed radio communication satellites operating in the Ka band provide high transmission capacities, in the order of one hundred or so Gbps, by virtue of the use of fine antenna beams or pencils, combined with spatial reuse of frequency resources in a fixed wide band and with an effective strategy of adaptive modulation and coding of the transmission channels.

Among conventional frequency reuse schemes, the scheme corresponding to allocation of four distinct sub-bands over all of the coverage spots of the multibeam antenna according to a four-colour pattern is well known. A four-colour frequency reuse scheme, denoted by the abbreviation 4-FR, divides the whole of the band allocated to the system into four sub-bands of distinct frequencies or four colours, and allow adjacent beams of the transmission or reception satellite antenna to be transmitted on various sub-bands according to a forward channel from the satellite to the ground, or to be received on the various sub-bands according to a return channel from the ground to the satellite. A 4-FR four-colour frequency reuse scheme makes it possible to have a constant minimum interbeam distance between beams of the same colour, and therefore to obtain a reasonable compromise between the reuse factor for the band and the isolation between beams.

However, when, given a fixed number of beams for a geographical coverage, it is desirable to decrease the number of colours, the frequency reuse C/I, determined by the distance between two spots of the same colour, decreases, which decreases spectral efficiency and limits, or even prevents, a gain in communication capacity of the system.

To improve the total capacity of the system within a forward channel context, that is to say of the transmission spots of the satellite antenna, the article by O. Vidal et al. entitled "Fractional Frequency Reuse in fixed Broadband High Throughput Satellite systems", published in Proceedings of 31st AIAA International Communication Satellite Systems Conference, Oct. 14-17, 2013, Florence, Italy, describes a solution that increases the bandwidth used per spot for each of the spots of a coverage. This solution takes advantage of fractional frequency reuse schemes, denoted by FFR, which are used in terrestrial mobile networks such as WiMAX and LTE. The FFR technique applied in a satellite radio communication system within a forward channel context is a frequency reuse technique that covers the conventional patterns of colours, that is to say, for example, 3, 4, 7, 12 colours, by combining them with denser reuse schemes for the frequencies within each beam. The document by O. Vidal describes, without limiting generality, a conventional 7-colour reuse scheme (7-FR) combined with a scheme for full reuse of a sub-band (1-FR). In this configuration, the sub-band F0 in the 1-FR scheme and the sub-bands Fi in the 7-FR scheme are used on a permanent basis in their assignment beams, but at any point in the coverage, the C/I ratio observed in the sub-band Fi will be higher than the C/I observed in the sub-band F0 on account of a lower reuse factor for F0.

The technical problem is to increase, for a fixed transmission band and onboard power of the satellite, the satellite capacity or the capacity density of the forward channel of a multibeam satellite radio communication system that uses a fractional FFR or complete frequency reuse scheme according to which a sub-band that is common to all the reception spots is allocated to the internal area of each transmission spot.

More particularly, the technical problem is to increase the surface of the internal area of each transmission spot without decreasing the signal-to-interference ratio C/I or, for a fixed surface of the internal area of each transmission spot, to increase the signal-to-interference ratio C/I.

SUMMARY OF THE INVENTION

To this end, the subject of the invention is a broadband multibeam satellite radio communication system, configured for fractional reuse of frequencies of a total band BT allocated to a forward channel, comprising:

a satellite having a multibeam transmission antenna system, configured to cover a geographical service area that is broken down into a plurality of transmission spots, having a first grid G1 of spots and a second grid G2 of transmission spots, the transmission spots of the first grid G1 and the transmission spots of the second grid G2 being positioned and their radiation patterns being configured such that there are points of intersection between the roll-off isocontours of an integral number m, greater than or equal to three, of partially overlapping adjacent spots, the number m denoting the order of multiplicity of the points of intersection; and a set of receiving terminals that are distributed over all of the transmission spots, each receiving terminal comprising a geographical positioning means and a reception means according to an allocated transmission resource;

a forward channel transmission resource planner and allocator, which is implemented in the form of one or more electronic computers and configured to assign to a receiving terminal, when it so demands, a forward channel transmission resource in terms of a frequency sub-band of the total band BT and of a polarization state taken from among a first polarization state P1 and a second polarization state P2 on the basis of the geographical position of the receiving terminal and a forward channel transmission resource allocation plan according to which each transmission spot is made up of a central internal area and a peripheral area surrounding the central internal area; and the first polarization state and the second polarization state are respectively allocated to the spots of the first grid G1 and to the spots of the second grid G2; and one and the same main band BP of frequencies in one piece or in multiple pieces, forming a dominant part of the total band BT in terms of occupied band, is allocated wholly to each central internal area of the spots of the first and second grids; and the frequencies of the total band BT that are not part of the main band BP form a secondary band BS in one piece or in multiple pieces that is broken down into an integral number n, greater than or equal to 2, of secondary sub-bands in one piece that are each, separately or adjacently, distributed over all of the peripheral areas of the transmission spots according to a multicoloured scheme with n colours of secondary sub-bands, characterized in that the points of intersection between the spots of the first and second grids are quadruple points of intersection, that is to say having an order of multiplicity equal to 4.

According to particular embodiments, the multibeam satellite radio communication system comprises one or more of the following features:

the quadruple points define elemental useful coverage surfaces at the rate of one per spot that form a pavement of the coverage area, and each elemental useful surface constitutes a mesh of the pavement of the same size and of the same shape, and the shape of the mesh is a parallelogram;

the shape of the mesh is a square or a rectangle or a diamond;

each internal area is inscribed in the elemental useful surface of its transmission spot;

the number n of secondary sub-bands is an integer included in the set of numbers 2, 3, 4, 7 and 12, and preferably equal to 2;

the first and second polarization states (P1, P2) are the left circular polarization and the right circular polarization or a first linear polarization according to a first axis and a second linear polarization according to a second axis, which is orthogonal with respect to the first axis;

the multibeam transmission antenna system has first and second single feed per beam (SFPB) transmission antennas, the first antenna having a first network of distributed feeds in accordance with a square first network mesh and a first main reflector; the second antenna having a second network of distributed feeds in accordance with a square second network mesh and a second main reflector; and the first and second networks of feeds and the first and second main reflectors are geometrically configured so as to form a coverage for the service area with quadruple points and square coverage mesh;

the multibeam transmission antenna system has a single multiple feed per beam (MFPB) transmission antenna; and the transmission antenna has a main reflector and a network of multiple feeds illuminating the reflector, the feeds being distributed according to a hexagonal or square antenna network mesh and being associated in multiple groups that are staggered in relation to one another in X and Y directions of a plane, each feed having a radiating element linked to a microwave channel; each feed has a first port and a second port for transmission of the same frequency (F) and with polarizations (P1, P2) that are orthogonal among themselves; the feeds are associated by groups of four adjacent feeds in X and Y directions; for each group of four adjacent feeds, the first transmission ports or the second transmission ports corresponding to one and the same couple of frequency and polarization values (F, P1), (F, P2) are connected among themselves, the four transmission ports connected among themselves forming a transmission beam; for the formation of each beam, the links between the transmission ports of a group of four feeds are implemented by distribution circuits, the distribution circuits dedicated to the formation of different beams being independent among themselves; the network of feeds, the reflector and the distribution circuits are configured in terms of geometry and connectivity so as to form a total coverage or a semi-coverage for the service area by means of transmission spots distributed in accordance with a coverage mesh that is included among the rectangular, diamond-shaped and square meshes;

the mesh of the network of feeds is a hexagonal antenna network mesh and the radiating aperture of the radiating element has a circular or square shape; and two consecutive adjacent groups (Gr1, Gr2) in the X direction are spaced apart by a first pitch L1 corresponding to a feed in the X direction and share a feed in common; two consecutive adjacent groups (Gr1, Gr3) in the Y direction are spaced apart by a second pitch L2 corresponding to a feed in the Y direction and share a feed in common; each group of four feeds forming a transmission beam of substantially rectangular or diamond shape for adjustment of the associated distribution circuits;

the mesh of the network of feeds is a hexagonal antenna network mesh and the radiating aperture of the radiating element has a circular or square shape; and two consecutive adjacent groups (Grp1, Grp2) in the X direction are spaced apart by a first pitch L1 corresponding to a feed in the X direction and share two feeds in common; and two consecutive adjacent groups (Grp1, Grp3) in the Y direction are spaced apart by a second pitch L2 corresponding to two feeds in the Y direction and do not share any feed in common; and each group of four feeds forms a transmission beam of substantially diamond or rectangular shape for adjustment of the distribution circuits associated with said group;

the mesh of the network of feeds is a square antenna network mesh and the radiating aperture of the radiating element has a square shape; and the two directions X and Y form a right angle; and two consecutive adjacent groups (Gr1, Gr2) in the X direction are spaced apart by a first pitch L1 corresponding to a feed in the X direction and share a feed in common; and two consecutive adjacent groups (Gr1, Gr3) in a Y direction are spaced apart by a second pitch L2 corresponding to a feed in the Y direction and share a feed in common; and each group of four feeds forms a transmission beam of substantially square shape for adjustment of the distribution circuits associated with said group; and the network of feeds, the reflector and the distribution circuits are configured in terms of geometry and connectivity so as to form a total coverage for the service area by means of transmission spots distributed in accordance with a square coverage mesh;

the multibeam transmission antenna system has a first transmission antenna and a second multiple feed per beam (MFPB) antenna; and the first transmission antenna has a first main reflector and a first network of multiple feeds illuminating the first main reflector; the second transmission antenna has a second main reflector and a second network of multiple feeds illuminating the second main reflector; the first and second networks have an identical architecture in accordance with which the feeds for an antenna network are distributed according to a hexagonal network mesh and associated in multiple groups that are staggered in relation to one another in X and Y directions of a plane, each feed having a radiating element linked to a microwave channel; each feed has a first port and a second port for transmission of the same frequency (F1) and with polarizations (P1, P2) that are orthogonal among themselves; the feeds are associated by groups of four adjacent feeds in the X and Y directions; for each group of four adjacent feeds, the first transmission ports corresponding to one and the same couple of frequency and polarization values (F1, P1), (F1, P2) are connected two by two in the X direction and then two by two in the Y direction, the four transmission ports connected among themselves forming a transmission beam; for the formation of each beam, the links between the transmission ports of a group of four feeds are implemented by distribution circuits, the distribution circuits dedicated to the formation of different beams being independent among themselves; the first and second networks of feeds, the first and second main reflectors and the distribution circuits are configured in terms of geometry and connectivity so as to form a total coverage for the service area by means of transmission spots distributed in accordance with a rectangular or diamond-shaped coverage mesh;

the mesh of the first network of feeds and of the second network of feeds is a hexagonal antenna network mesh and the radiating aperture of the radiating element of each feed has one and the same circular or square shape; and for each network: two consecutive adjacent groups (Grp1, Grp2) in the X direction are spaced apart by a first pitch L1 corresponding to a feed in the X direction and share two feeds in common; two consecutive adjacent groups (Grp1, Grp3) in the Y direction are spaced apart by a second pitch L2 corresponding to two feeds in the Y direction and do not share any feed in common; each group of four feeds forming a transmission beam of substantially diamond shape for adjustment of the associated distribution circuits;

the mesh of the first network of feeds and of the second network of feeds is a hexagonal antenna network mesh and the radiating aperture of the radiating element of each feed has one and the same circular or square shape; and for each network: two consecutive adjacent groups (Gr1, Gr2) in the X direction are spaced apart by a first pitch L1 corresponding to a feed in the X direction and share a feed in common; and two consecutive adjacent groups (Gr1, Gr3) in the Y direction are spaced apart by a second pitch L2 corresponding to a feed in the Y direction and share a feed in common; and each group of four feeds forms a transmission beam of substantially rectangular shape for adjustment of the distribution circuits associated with said group;

the satellite is configured to radiate in each spot and over the whole extent thereof, including its central area and its peripheral area, a transmitted colour of transmission resources that is formed by the main frequency band, by the secondary band and by the polarization state that are allocated to said spot by the frequency and polarization state plan;

the satellite radio communication system moreover comprises an automatic system for correcting the depointing of the antenna caused notably by variations in attitude of the platform of the satellite;

the satellite radio communication system moreover comprises a set of receiving terminals that are distributed over all of the spots, and each terminal comprises a geographical positioning means that is sufficiently precise to determine the transmission spot in which it is located, and whether it is located in an internal area or in a peripheral area of said transmission spot;

the forward channel transmission resource planner and allocator is distributed over all of the terminals and/or of one or more auxiliary stations or is in centralized form in a station for controlling the resources and for planning therefor;

the size of the central area varies on the basis of the transmission spot and time, or the size of the central area varies on the basis of the transmission spot and is independent of time or the size of the central area is constant independently of the transmission spot and time;

the multibeam satellite radio communication system defined above is configured for transmission of the forward channel by the satellite in a band included in all of the bands C, X, Ku, Ka, L, S, Q and V.

The subject of the invention is likewise a method for fractional reuse of frequencies of a total band allocated to a forward channel in a broadband multibeam satellite radio communication system, the system comprising:

a satellite having a multibeam transmission antenna system configured to cover a geographical service area that is broken down into a plurality of transmission spots, having a first grid G1 of spots and a second grid G2 of transmission spots, the transmission spots of the first grid G1 and the transmission spots of the second grid G2 being positioned and their radiation patterns being configured such that there are points of intersection between the roll-off isocontours of an integral number m, greater than or equal to three, of partially overlapping adjacent spots, the number m denoting the order of multiplicity of the points of intersection; and a set of receiving terminals that are distributed over all of the transmission spots, each receiving terminal comprising a geographical positioning means and a reception means according to an allocated transmission resource; and a forward channel transmission resource planner and allocator, implemented in the form of one or more electronic computers;

the method comprising the steps consisting in:

determining a forward channel transmission resource allocation plan according to which each transmission spot is made up of a central internal area and a peripheral area surrounding the central internal area; and the first polarization state and the second polarization state are respectively allocated to the spots of the first grid G1 and to the spots of the second grid G2; and one and the same main band BP of frequencies in one piece or in multiple pieces, forming a dominant part of the total band BT in terms of occupied band, is allocated wholly to each central internal area of the spots of the first and second grids; and the frequencies of the total band BT that are not part of the main band BP form a secondary band BS in one piece or in multiple pieces that is broken down into an integral number n, greater than or equal to 2, of secondary sub-bands in one piece that are each, separately or adjacently, distributed over all of the peripheral areas of the transmission spots according to a multicoloured scheme with n colours of secondary sub-bands;

assigning to a receiving terminal, when it so demands, a forward channel transmission resource in terms of a frequency sub-band of the total band BT and of a polarization state taken from among a first polarization state P1 and a second polarization state P2 on the basis of the geographical position of the receiving terminal; the method being characterized in that the points of intersection between the spots of the first and second grids are quadruple points, that is to say having an order of multiplicity equal to 4; and the quadruple points define elemental useful coverage surfaces at the rate of one per spot that form a pavement of the coverage area; and each elemental useful surface constitutes a mesh of the pavement having the shape of a parallelogram; and each internal area is inscribed in an elemental useful surface.

According to particular embodiments, the method for fractional reuse of frequencies comprises one or more of the following features:

the method for reuse of frequencies moreover comprising the steps consisting in: for each terminal that wishes to have a transmission resource, determining the transmission spot in which it is located and whether it is located in an internal area or in a peripheral area, then when the terminal is located in an internal area, allocating to the terminal a transmission resource of the main band and of the polarization state that have been assigned to the internal area of the transmission spot in which the terminal is located, or when the terminal is located in a peripheral area, allocating to the terminal a transmission resource of the auxiliary sub-band and the polarization state that have been assigned to the peripheral area of the transmission spot in which the terminal is located;

the size of the central area varies on the basis of the transmission spot and time, or the size of the central area varies on the basis of the transmission spot and is independent of time or the size of the central area is constant independently of the transmission spot and time.

BRIEF DESCRIPTION OF THE DRAWINGS

The invention will be better understood on reading the description of several embodiments that follows, which is provided solely by way of example and with reference to the drawings, in which:

FIGS. 8A and 8B respectively describe the geometry of a hexagonal coverage mesh and the geometry of a square coverage mesh, the meshes being inscribed in a fixed transmission spot with a circular aperture;

FIG. 9 is a view of the comparison of the performance, in terms of C/I, of the reuse scheme for the main band and the two polarization states with an identical useful surface area between the configuration of the first embodiment of the system of the invention in which the central useful surface of the transmission spot or the coverage mesh is square and the reference configuration in which the central useful surface of the transmission spot or the coverage mesh is hexagonal, the elemental useful surface areas being identical;

DETAILED DESCRIPTION

As a preamble, a few terms used hereinafter in the text are defined.

"Antenna" is understood to mean an assembly made up of a main reflector, dimensioned by a person skilled in the art according to criteria relating to the beams to be generated as regards a service coverage and possibly associated with one or more secondary reflectors as well as with a set of feeds arranged according to a planar network whose radiation image via the set of the reflector or reflectors generates a grid of beams ensuring all or part of the overlap of the transmission area.

"Transmission spot" is understood to mean a radio radiation beam transmitted by an antenna according to the forward channel of the satellite or the footprint of this beam on the terrestrial ground, the beam being able to be generated by a single feed in the case of an SFPB antenna or generated by multiple feeds, grouped among themselves into a grouping of feeds that is provided with a beam forming network (BFN), in the case of an MFPB antenna. A transmission spot is characterized on the ground by its centre, according to which the directivity is at a maximum, and a roll-off isocontour with a predetermined attenuation value.

"Coverage mesh" is understood to mean a polygonal geometric pattern formed by connecting the immediate multiple points surrounding the centre of each transmission spot. For each transmission spot, the coverage mesh defines a useful surface of the spot in which the internal area of the transmission spot is inscribed.

"Network mesh" is understood to mean a geometric pattern describing the position of the feeds for a network of an antenna, or more precisely the pattern established by connecting the centres of the feeds for the network.

Figure 1:
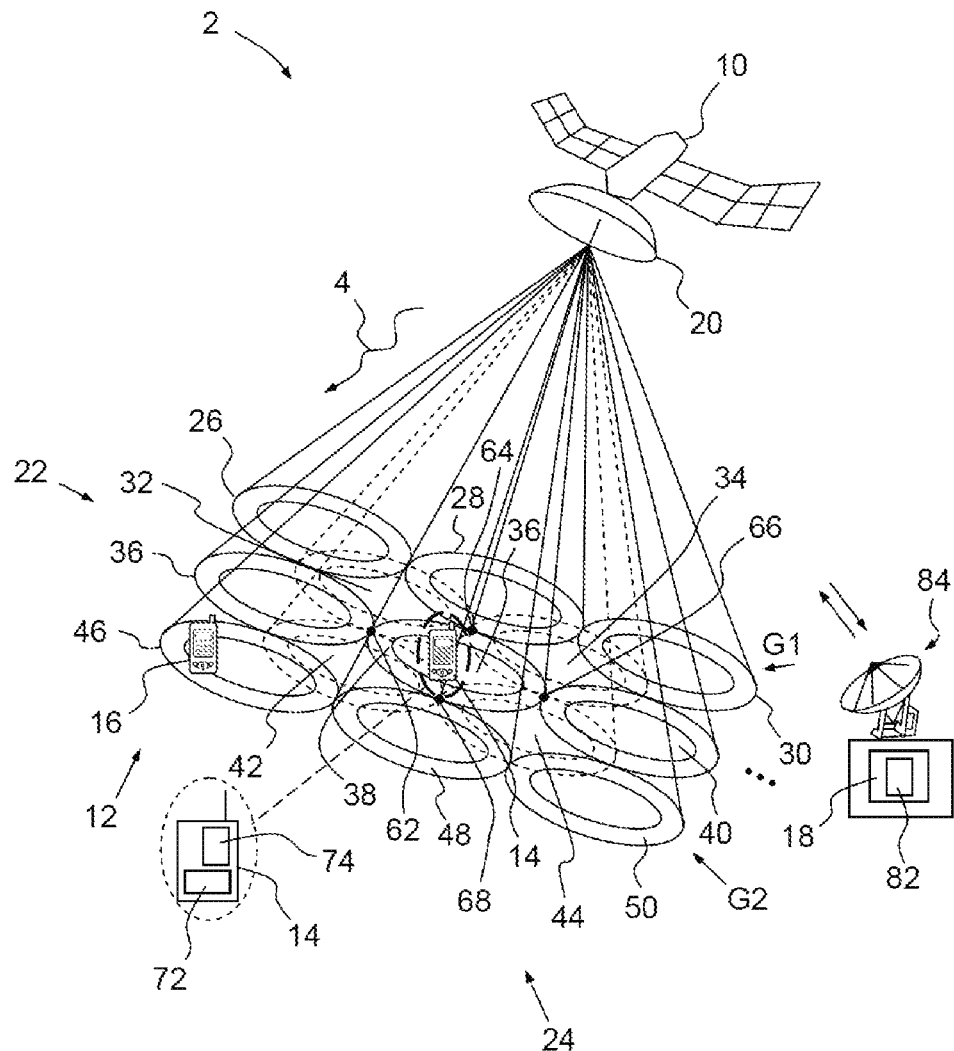
FIG. 1 is a view of a satellite radio communication system configured for reuse of frequencies and of two polarization states according to the invention.

According to FIG. 1, a broadband multibeam satellite radio communication system 2 is configured to implement complete or fractional reuse of frequencies of a total band BT allocated to a forward channel 4.

The satellite radio communication system 2 comprises a satellite 10, a set 12 of transmitting terminals 14, 16 and a forward channel transmission resource planner and allocator 18.

The satellite 10 has a multibeam transmission antenna system 20 configured to cover a geographical service or service coverage area 22 that is broken down into a plurality 24 of transmission spots 26, 28, 30, 32, 34, 36, 38, 40, 42, 44, 46, 48, 50.

According to FIG. 1 and by way of illustrative example, the set 24 of transmission spots for the terrestrial coverage has thirteen transmission spots 26, 28, 30, 32, 34, 36, 38, 40, 42, 44, 46, 48, 50 with the transmission spot 38 chosen arbitrarily for the subsequent testing of the C/I performance of the system 2.

The transmission spots 26, 28, 30, 36, 38, 40, 46, 48, 50, drawn in solid lines, form a first grid G1 of transmission spots while the transmission spots 32, 34, 42, 44, drawn in dotted lines, form a second grid G2 of transmission spots.

The transmission spots of the first grid G2 and the transmission spots of the second grid G2 are positioned globally and their radiation patterns are configured such that there are points of intersection between the roll-off isocontours of an integral number m, equal to 4, of partially overlapping adjacent transmission spots, the number m denoting the order of multiplicity of the points of intersection.

In this case, FIG. 1 shows only the quadruple points 62, 64, 66, 68 of the test spot 38, the point 62 being the point of intersection of the contours of the spots 32, 36, 38, 42, the point 64 being the point of intersection of the contours of the spots 28, 32, 34, 38, the point 66 being the point of intersection of the contours of the spots 34, 38, 40, 44 and the point 68 being the point of intersection of the contours of the spots 38, 42, 44, 48.

The quadruple points define elemental useful coverage surfaces at the rate of one per transmission spot that form a pavement of the geographical service area 22, and each elemental useful surface constitutes a mesh of the pavement of the same size and of the same shape, the shape of the mesh generally being that of a parallelogram.

According to FIG. 1 and by way of example, the covering mesh is square.

The receiving terminals 14, 16 of the set 12, only two of which are shown in FIG. 1 by way of simplification, are distributed over the set 24 of transmission spots, in this case the test spot 38 and the spot 46.

Each receiving terminal 14, 16 comprises a geographical positioning or geolocation means 72 and a reception means 74 according to a forward channel transmission resource.

The forward channel transmission resource planner and allocator 18, which is implemented in the form of one or more electronic computers 82, is configured to attribute to a receiving terminal, when it so demands, for example the receiving terminal 14, a forward channel transmission resource, generally a frequency sub-band in the total band BT and a polarization state among a first polarization state P1 and a second polarization state P2, on the basis of the geographical position of the receiving terminal, as determined by the geographical positioning means 72, and a transmission resource allocation plan that completely or fractionally reuses the frequencies of the total band BT allocated to the forward channel 4.

In this case, the forward channel transmission resource planner and allocator 18 is centralized in a station 84 for controlling the resources and planning them.

As a variant, the forward channel transmission resource planner and allocator is distributed over all of the terminals and/or one or more auxiliary stations.

Figure 2:
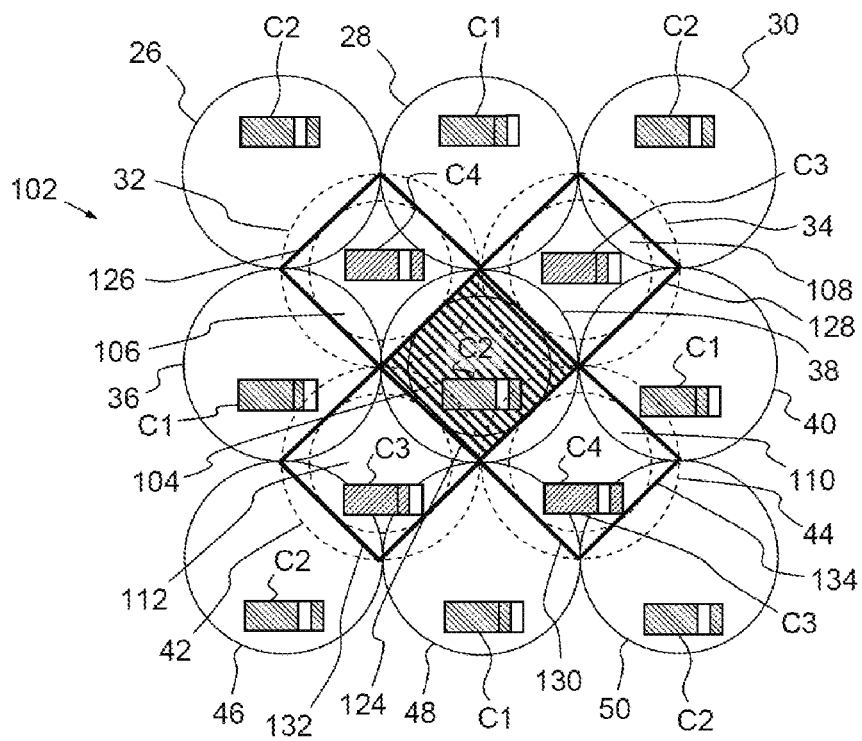
FIG. 2 is a view of a geographical frequency and polarization reuse scheme according to a first embodiment of the invention in which a coverage with quadruple points and square mesh for transmission spots with circular roll-off contours is implemented.

According to FIG. 2 and a first embodiment of a plan 102 for reuse of the frequencies and the polarization states at the forward channel 4 according to the invention, corresponding to a first embodiment of the system 2, each transmission spot is made up of a central internal area in one piece and of a peripheral area in one or more pieces surrounding the central internal area.

In this case, FIG. 2 shows only the central internal areas 104, 106, 108, 110, 112, in the form of disks, of the transmission spots 38, 32, 34, 42, 44.

Generally, the central internal area of each transmission spot is inscribed in the elemental useful coverage surface of said spot in the shape of a parallelogram.

In this case, FIG. 2 shows only the square-shaped useful surfaces of the transmission spots 104, 106, 108, 110, 112, said surfaces being respectively denoted by the numerical references 124, 126, 128, 130, 132. Overall, the useful surfaces 124, 126, 128, 130, 132 of the transmission spots 104, 106, 108, 110, 112 form a cross 134 whose arms are disposed diagonally in FIG. 2. The central internal areas 104, 106, 108, 110, 112 are respectively inscribed in the useful surfaces 124, 126, 128, 130, 132.

For each transmission spot, the peripheral area is the complementary area of the central area of said spot in relation to its elemental useful surface. In this case, in FIG. 2 and by way of example, the peripheral area of a transmission spot is formed by four separate corner areas of the elemental useful surface of the transmission spot.

According to the transmission resource allocation plan 102, one and the same main band BP of frequencies, in this case in one piece and forming part of the total band BT at the start of the band, is allocated wholly to each central internal area of the transmission spots, notably to the central areas 104, 108, 110, 112, 114, 116, 118.

Generally, one and the same main band BP of frequencies in one piece or in multiple pieces, forming a dominant part of the total band BT in terms of occupied band, is allocated wholly to each central internal area of the spots of the first and second grids G1, G2.

The frequencies of the total band BT that are not part of the main band BP form a secondary band BS in one piece or in multiple pieces that is broken down into an integral number n, greater than or equal to 2, of secondary sub-bands in one piece that are each, separately or adjacently, distributed over all of the peripheral areas of the transmission spots according to a multicoloured scheme with n colours of secondary sub-bands.

In this case, in FIG. 2 and by way of example, the number n of secondary sub-bands is equal to 2 and the secondary band BS is broken down into a first secondary sub-band BS1 and a second secondary sub-band BS2.

Independently of the frequency bands allocated to each of the spots, the first polarization state P1 and the second polarization state P2 are respectively allocated to the spots of the first grid and to the spots of the second grid.

Figure 3:
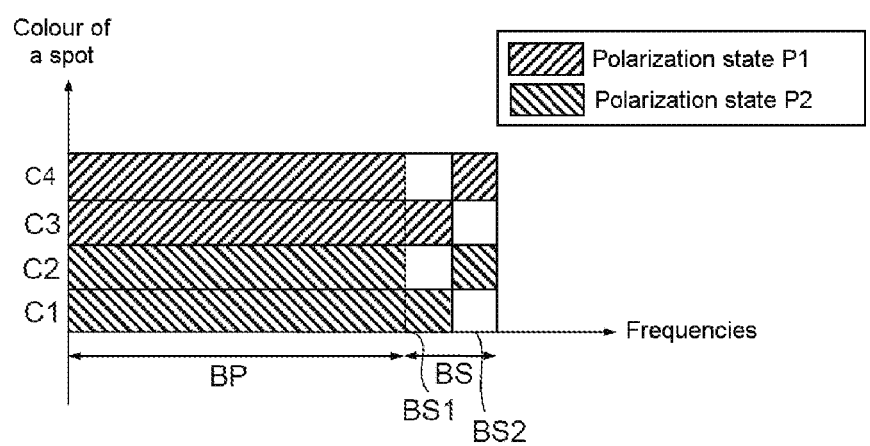
FIG. 3 is an overview of the colours of transmission resources that can be transmitted per spot at the rate of one colour per spot according to the frequency and polarization plan of FIG. 2, a transmission resource colour being the association of a polarization state and a frequency band made up of one and the same main band and a secondary band sub-band.

According to FIG. 3, the colours of transmission resources that are able to be transmitted per spot at the rate of one colour per spot, according to the frequency and polarization plan 102 of FIG. 2, are coded by strips of colours C1, C2, C3 and C4 in which a first pattern hatched to the right toward the bottom of the figure corresponds to transmission in the first polarization state P1 while a second pattern hatched to the left toward the bottom of the figure corresponds to transmission in the second polarization state P2.

The first colour C1 is transmission of electromagnetic radiation in the main band BP and in the first secondary band BS1, which are associated with the first polarization state P1. The second colour C2 is transmission of electromagnetic radiation in the main band BP and in the second secondary band BS2, which are associated with the first polarization state P1. The third colour C3 is transmission of electromagnetic radiation in the main band BP and in the first secondary band BS1, which are associated with the second polarization state P2. The fourth colour C4 is transmission of electromagnetic radiation in the main band BP and in the second secondary band BS2, which are associated with the second polarization state P2.

According to FIG. 2, the radiation colours C1 and C2 are respectively assigned to the first group of spots 28, 36, 40, 48 and to the second group of spots 26, 30, 38, 46, 50 of the first grid G1 while the radiation colours C3 and C4 are respectively assigned to the third group of spots 34, 42 and to the fourth group of spots 32, 44 of the second grid G2.

Preferably, the second number n of secondary sub-bands is an integer included in the set of numbers 3, 4, 7 and 12.

The first and second polarization states P1, P2 are the left circular polarization and the right circular polarization or a first linear polarization along a first axis and a second linear polarization along a second axis, which is orthogonal with respect to the first axis.

Figure 4:
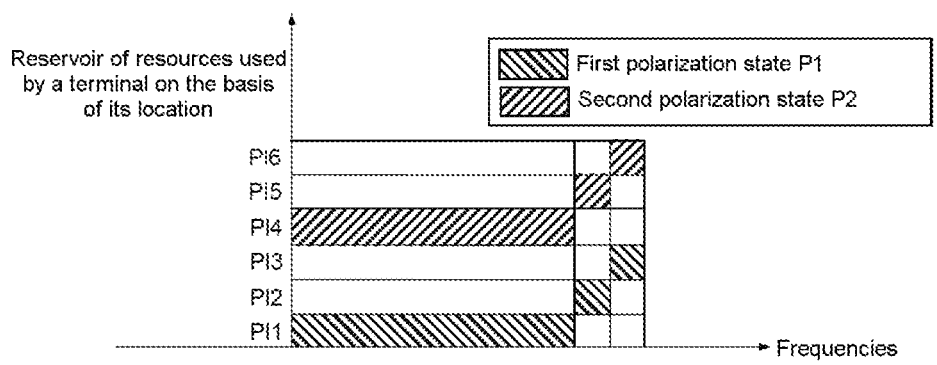
FIG. 4 is an overview of the configurations of transmission resources that can be used by a reception terminal according to the frequency and polarization plan of FIG. 2, a configuration of transmission resources that can be used by the terminal being the association of a polarization state and a frequency band among the main band and the secondary bands.

According to FIG. 4, the various planned reserves of resources that can be assigned to a terminal on the basis of its geographical location according to the frequency and polarization plan of FIG. 2 are coded by strips of transmission reserves P11, P12, P13, P14, P15, P16.

When the receiving terminal is located in a central internal area of a transmission spot of colour C1 or C2, it will be assigned a transmission resource from the reservoir P11, which is made up of the main frequency band BP associated with the first polarization state P1.

When the receiving terminal is located in a peripheral area of a transmission spot of colour C1, it will be assigned a transmission resource from the reservoir P12, which is made up of the first band of secondary frequencies BS1 that is associated with the first polarization state P1.

When the receiving terminal is located in a peripheral area of a transmission spot of colour C2, it will be assigned a transmission resource from the reservoir P13, which is made up of the second band of secondary frequencies BS2 that is associated with the first polarization state P1.

When the receiving terminal is located in a central internal area of a transmission spot of colour C3 or C4, it will be assigned a transmission resource from the reservoir P14, which is made up of the main frequency band BP associated with the second polarization state P2.

When the receiving terminal is located in a peripheral area of a transmission spot of colour C3, it will be assigned a transmission resource from the reservoir P15, which is made up of the first band of secondary frequencies BS1 that is associated with the second polarization state P2.

When the receiving terminal is located in a peripheral area of a transmission spot of colour C4, it will be assigned a transmission resource from the reservoir P16, which is made up of the second band of secondary frequencies BS2 that is associated with the second polarization state P2.

Figure 5:
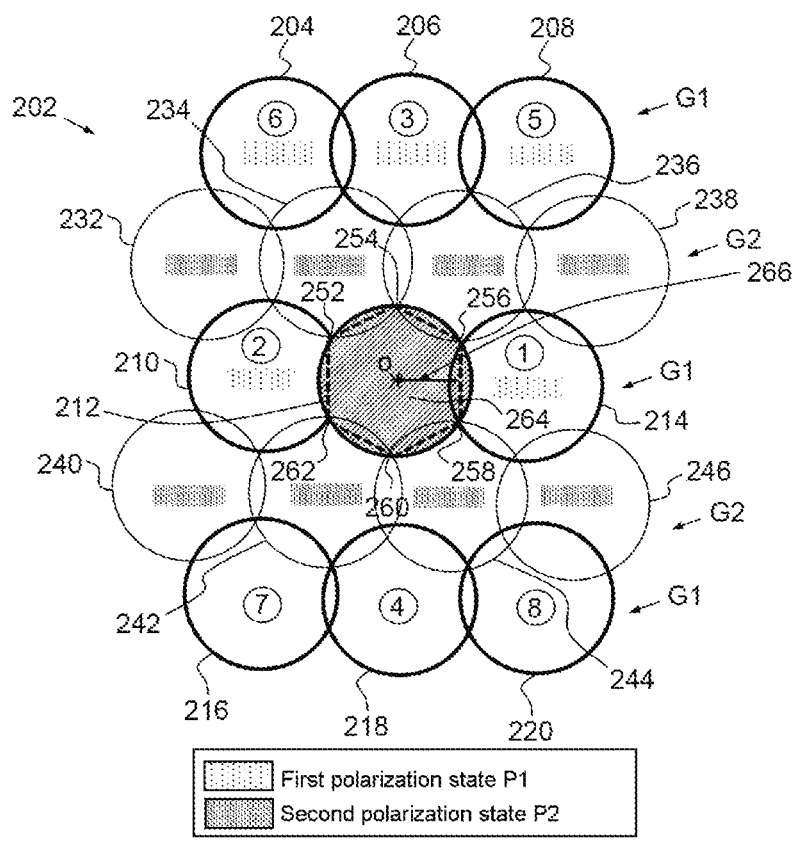
FIG. 5 is a view of a conventional geographical reuse scheme for one and the same main band of frequencies and two polarization states by the transmission spots of the satellite, using a hexagonal coverage mesh for the transmission spots, and serving as a reference in the evaluation of the transmission performance of a geographical reuse scheme for the same main band of frequencies and the two polarization states by the transmission spots of the satellite when the coverage mesh used for the transmission spots is a parallelogram.

According to FIG. 5, a reference configuration for a resource allocation plan 202 that is part of the prior art is illustrated in order to show the improvement in the transmission capacity that is brought to the system by the use of the frequency and polarization reuse plan 102 of FIG. 2.

The resource allocation plan 202 is conventional geographical reuse of one and the same main band of frequencies and of two polarization states by the transmission spots of the satellite. The coverage uses a first grid G1 of transmission spots 204, 206, 208, 210, 212, 214, 216, 218, 220 with a first polarization state P1 and a second grid G2 of transmission spots 232, 234, 236, 238, 240, 242, 244, 246 with a second polarization state P2. The grids of spots G1 and G2 are staggered among themselves so as to cover the geographical service area 22 in optimum fashion. Thus, the centres of the spots of the grid G2 are positioned in the holes in the coverage that is provided by the spots of the first grid G1.

The triple points of any spot, particularly the triple points 252, 254, 256, 258, 260, 262 of the transmission spot 212, which is chosen as reference spot in this case, for example, define an elemental useful surface 264 or coverage mesh of hexagonal shape.

Thus, the allocation plan 202 for transmission resources serving as a reference differs from the plan 102 for reuse of the main band and of the two polarization states of FIG. 2 in that the coverage provided is a coverage with triple points using a hexagonal coverage mesh.

The C/I performance will be evaluated along a horizontal path segment 266 in FIG. 5 on the elemental useful surface 264 from the centre O of the spot 212 to the edge of the elemental useful surface 264.

The sources of interference taken into account in the computation of the C/I are the transmission spots 214, 210, 206, 218, 208, 204, 216, 220, which are numbered from 1 to 8 according to an order of decreasing degree of contribution. Thus, the contributions of the spots 214, 210 in terms of interference preponderate over those of the spots 206, 218 and even more over those of the spots 208, 204, 216, 220.

Figure 6:
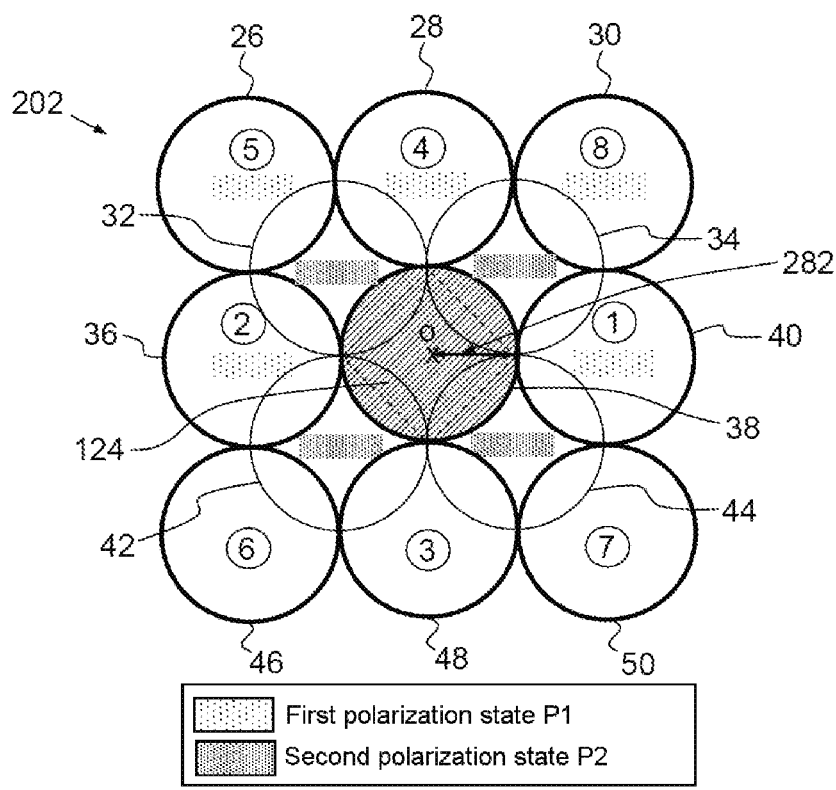
FIG. 6 is a view of a geographical reuse scheme for one and the same main band of frequencies and two polarization states by the transmission spots of the satellite in which the coverage mesh used for the transmission spots is square, and which corresponds to the satellite transmission coverage and to the geographical allocation plan for the transmission resources by the system of the first embodiment of the system.

According to FIG. 6, the frequency and polarization reuse plan 102 of FIG. 2 is recalled by describing the horizontal path segment 282 along which C/I performance is evaluated in the elemental useful surface 124 of square shape and by indicating the sources of interference taken into account for the computation of the C/I.

The path segment 282 sets out from the centre O of the spot 38 to the edge of the elemental useful surface 124.

The sources of interference taken into account in the computation of the C/I are the transmission spots 40, 36, 48, 28, 26, 46, 50, 30, which are numbered from 1 to 8 according to an order of decreasing degree of contribution. Thus, the contributions of the spots 40, 36 in terms of interference preponderate over those of the spots 28, 48 and even more over those of the spots 26, 46, 50, 30.

Figure 7:
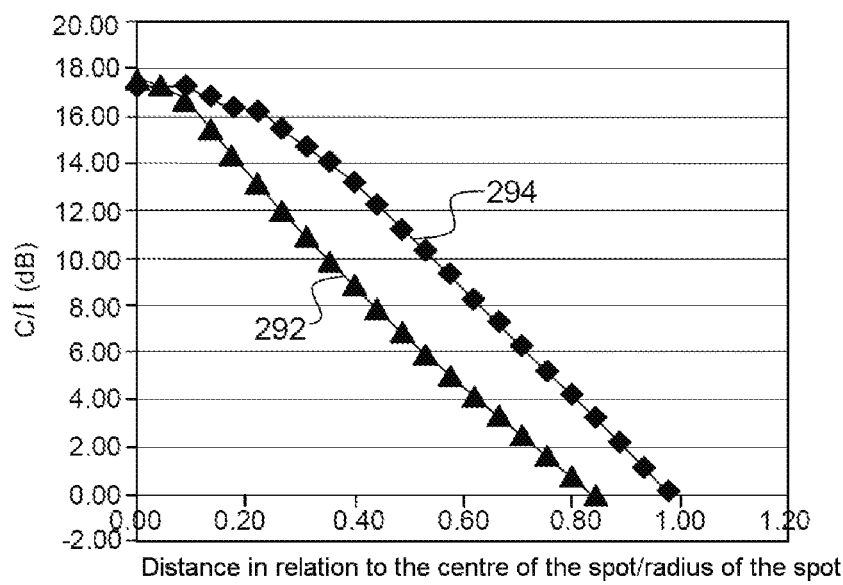
FIG. 7 is a view of the comparison of the performance, in terms of C/I, of the reuse scheme for the main band and the two polarization states at an identical aperture angle for the spots, between the configuration of the first embodiment of the system of the invention in which the central useful surface of the transmission spot or the coverage mesh is square (FIG. 6) and the reference configuration in which the central useful surface of the transmission spot or the coverage mesh is hexagonal (FIG. 5), the aperture angle of the spots being identical.

According to FIG. 7, the C/I performance of the frequency and polarization reuse scheme 102 of FIG. 2 or 6 according to the invention with quadruple points and square coverage mesh and the performance of the conventional scheme serving as a frequency and polarization reuse reference 202 of FIG. 5 with triple points and hexagonal coverage mesh are compared.

In this case, the schemes 102 and 202 each use a different pair of single feed per beam (SFPB) antennas whose feeds have one and the same radiation pattern and particularly one and the same aperture, in this case equal to 0.45 degrees.

A first curve 292 represents the progression of the C/I, observed in the case of the reuse plan 202 of FIG. 5 and of a coverage with triple points and hexagonal coverage mesh for a mobile moving along the segment 266, on the basis of the distance of the mobile in relation to the centre of the spot 212, as normalized in relation to the radius of the spot 212.

A second curve 294 represents the progression of the C/I, observed in the case of the plan 102 of FIG. 6 and of a coverage with quadruple points and square coverage mesh for a mobile moving along the segment 282, on the basis of the distance of the mobile in relation to the centre of the spot 38, as normalized in relation to the radius of the spot 38.

The comparison of the curves 294 and 292 shows an improvement in the C/I over more or less the whole of the elemental useful surface of between 3 and 4 dB when passing from a coverage with triple points and hexagonal coverage mesh to a coverage with quadruple points and square coverage mesh.

This result can be generalized to a coverage with quadruple points and coverage mesh in the shape of a parallelogram.

According to FIGS. 8A and 8B, the geometry of a hexagonal coverage mesh and the geometry of a square coverage mesh are shown, the meshes being inscribed in a transmission spot of fixed aperture of radius R1 for the hexagonal coverage mesh and of radius R2 for the square coverage mesh.

The useful surface S1 in the case of meshing with triple points and a hexagonal mesh inscribed in a spot of radius R1 is expressed by the equation:

$$S1 = 3*\sqrt{3}*R1^2/2$$

The useful surface S2 in the case of meshing with quadruple points and a square mesh inscribed in a spot of radius R2 is expressed by the equation:

$$S2 = 2*R2^2$$

To have the same useful surface in terms of area, it is necessary to satisfy the relationship $$(R2/R1) = (\sqrt{3*\sqrt{3}}/2) = 1.14,$$

that is to say that it is necessary for the radius of the spot R2 having the square mesh with quadruple points to be 14% greater than the radius of the spot R1 having the hexagonal mesh with triple points.

The C/I corresponding to a coverage with quadruple points and square mesh with larger spots (i.e. spots of 0.45°) is compared in FIG. 9 with the C/I corresponding to a coverage with triple points and hexagonal mesh with smaller spots (i.e. spots of 0.40°).

According to FIG. 9, a first curve 297 represents the progression of the C/I, observed in the case of the plan 202 of FIG. 5 and a coverage with triple points and hexagonal coverage mesh for a mobile moving along the segment 266, on the basis of the distance of the mobile in relation to the centre of the spot 212, as normalized in relation to the radius of the spot 212 (i.e. a radius corresponding to 0.40° of aperture).

A second curve 299 represents the progression of the C/I, observed in the case of the plan 102 of FIG. 6 and a coverage with quadruple points and square coverage mesh for a mobile moving along the segment 282, on the basis of the distance of the mobile in relation to the centre of the spot 38, as normalized in relation to the radius of the spot 38.

The comparison of the curves 299 and 297 still shows an improvement in the C/I over more or less the whole of the elemental useful surface of between 3 and 4 dB toward the edge of the surface, and distinctly higher by going to the centre of the spot when passing, for the same useful surface area, from a coverage with triple points and hexagonal coverage mesh to a coverage with quadruple points and square coverage mesh.

This planning and reuse of the frequencies and of the two polarization states thus makes it possible to obtain a C/I gain and consequently to enlarge the central internal area of each transmission spot on a C/I criterion.

Figure 10A:
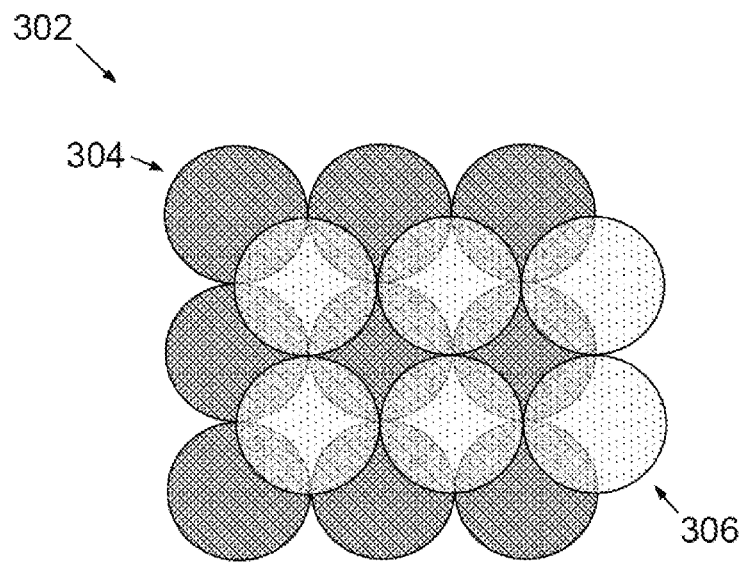
FIG. 10A is a superimposed view of a first network of feeds for a first SFPB (Single Feed Per Beam) antenna and of a second network of feeds for a second SFPB antenna, which is staggered in relation to the first in one and the same image plane, this antenna configuration implementing the first embodiment of the system of FIG. 2.

According to FIG. 10A, the images 304, 306, respectively of a first network of feeds for a first SFPB antenna and of a second network of feeds for a second SFPB antenna that is staggered in relation to the first in one and the same image plane, the first and second antennas forming the antenna system implementing the first embodiment of the system 102 of FIG. 2, are shown superimposed in one and the same image plane 302.

The first antenna has the first network of distributed feeds in accordance with a square first network mesh and a first main reflector, which is not shown in FIG. 10A but supposedly in the background of FIG. 10A toward the observer of the figure.

The second antenna has the second network of distributed feeds in accordance with a square second network mesh and a second main reflector.

The first and second networks of feeds and the first and second main reflectors are geometrically configured so as to form useful coverage spots distributed on the ground in accordance with a square mesh.

Figure 10B:
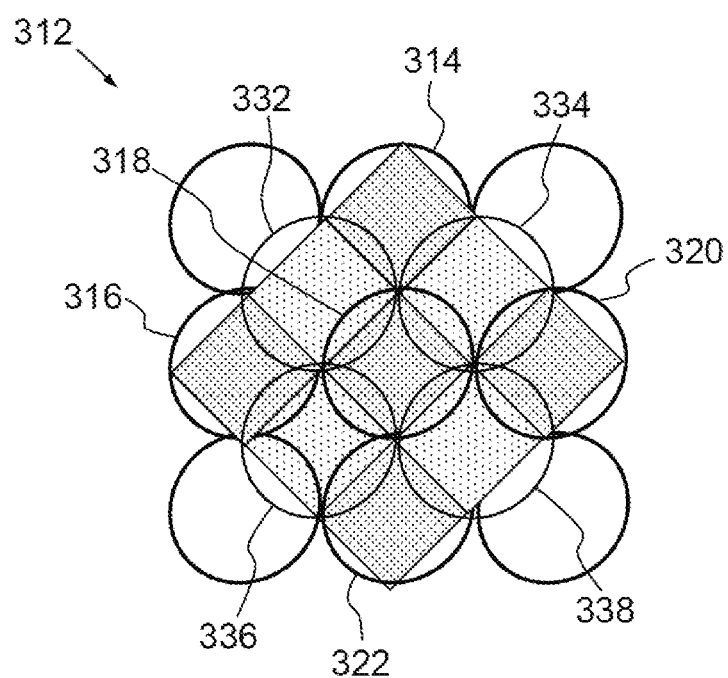
FIG. 10B is a view of the optimum, in terms of C/I, coloured coverage of the first embodiment of the system of FIG. 2, as implemented by the antenna configuration of FIG. 10A.

FIG. 10B is a view of the coverage 312 paved and coloured by the elemental surfaces of square shape, a first grid of elemental surfaces having the same polarization P1 being generated by the spots of the first grid of spots G1, notably the spots 314, 316, 318, 320, 322, which are themselves generated by the first network of feeds, an image 304 of which is provided in FIG. 10A, a second grid of elemental surfaces having the same polarization P2 being generated by the spots of the second grid of spots G2, notably the spots 332, 334, 336, 338, which are themselves generated by the second network of feeds, an image 306 of which is provided in FIG. 10A.

This pavement coloured by elemental useful surfaces of square shape in accordance with the first embodiment of the system 102 of FIG. 2, which is implemented by the antenna configuration of FIG. 10A, makes it possible to implement a coverage that is improved in terms of C/I for the geographical service area 22.

Figure 11:
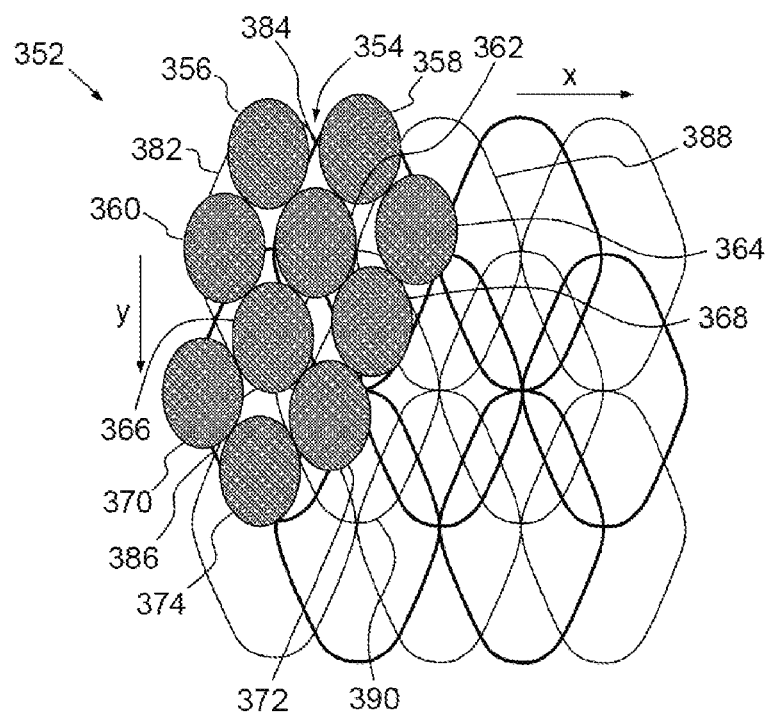
FIG. 11 is a view of a first configuration of an MFPB antenna with a hexagonal network mesh and more particularly of its network of feeds and of its groupings into quadruple feeds, which groupings are appropriately connected so as to implement a second embodiment of a system according to the invention in which the coverage mesh is rectangular.

FIG. 11 is a partial view of a first configuration of an MFPB antenna system 352 (i.e. having multiple feeds per beam) with a hexagonal network mesh and more particularly a view of its network of feeds 354 and of its groupings, into quadruple feeds, that are appropriately connected so as to implement a second embodiment of a system according to the invention in which the coverage mesh is rectangular.

The multibeam transmission antenna system 352 is implemented by a single multiple feed per beam (MFPB) transmission antenna that has a main reflector and the network 354 of multiple feeds illuminating the reflector.

In this case, only ten feeds 356, 358, 360, 362, 364, 366, 368, 370, 372, 374 are shown. The feeds are distributed according to a hexagonal antenna network mesh and are associated in multiple groups 382, 384, 386, 388, 392, 394, 396, 398 of four feeds, which are staggered in relation to one another in X and Y directions of a plane, each feed having a radiating element linked to a microwave channel. The feeds can have a circular or square aperture.

It should be noted that the patent FR 2 939 971 discloses the practice of implementing a very compact radio frequency channel by using a two-path asymmetric orthomode transducer, called OMT, associated with an unbalanced path coupler. This radio frequency channel operates in bipolarization mode on transmission and reception and has radio frequency components and combining circuits whose dimensions do not exceed the diameter of the horn.

In this case, in FIG. 11, two consecutive adjacent groups in the X direction are spaced apart by a first pitch L1 corresponding to a feed in the X direction and share a feed in common, and two consecutive adjacent groups in the Y direction are spaced apart by a second pitch L2 corresponding to a feed in the Y direction and share a feed in common.

In this case, in FIG. 11, only the three groupings 382, 384, 386 are described explicitly here.

The first grouping 382, denoted by Gr1, has feeds 356, 360, 362, 366.

The second grouping 384, denoted by Gr2, has the feeds 358, 362, 364, 368, is adjacent to the first grouping 382, Gr1, and is spaced apart from the latter by the pitch L1 in the X direction. The first and second groupings Gr1, Gr2 share the feed 362 in common.

The third grouping 386, denoted by Gr3, has the feeds 366, 370, 372, 374, is adjacent to the first grouping 382, Gr1, and is spaced apart from the latter by the pitch L2 in the Y direction. The first and third groupings Gr1, Gr3 share the feed 366 in common.

Each feed has a first port T1 and a second transmission port T2 for the same frequency F, with the first polarization P1 for the first port T1 and with the second polarization P2 for the second port, the first and second polarizations P1, P2 being orthogonal among themselves, and the frequency F denoting the total band of frequencies BT in a simplified manner.

For each group of four adjacent feeds, the four first transmission ports T1 or the four second transmission ports T2 corresponding to one and the same couple of frequency and polarization values, (F, P1) or (F, P2), are connected among themselves, the four transmission ports connected among themselves forming a transmission beam.

For the formation of each beam, the links between the transmission ports of a group of four feeds are made by distribution circuits, the distribution circuits dedicated to the formation of different beams being independent among themselves.

The network of feeds, the reflector and the distribution circuits are configured in terms of geometry and connectivity so as to form elemental useful surfaces for spots distributed in accordance with a rectangular coverage mesh.

Figure 12:
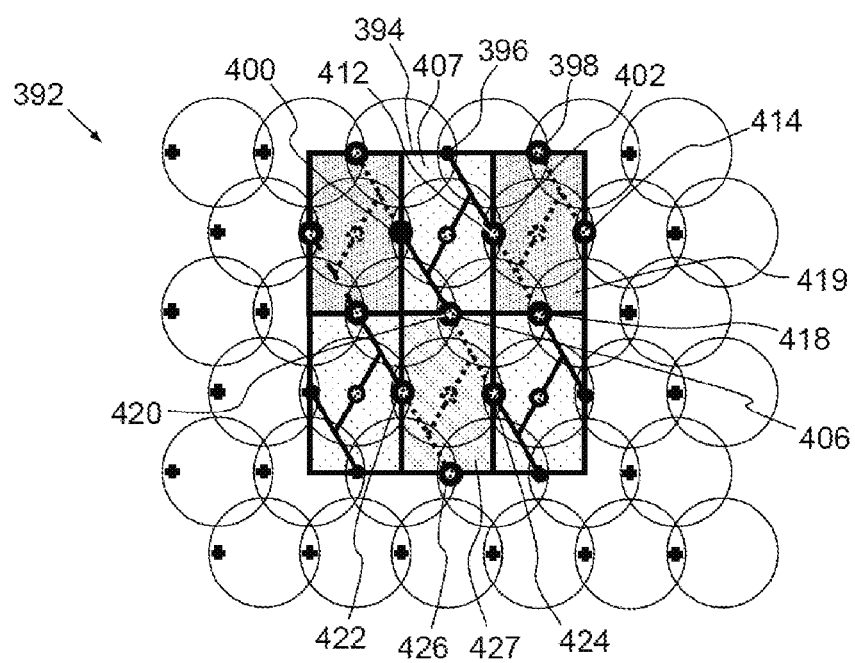
FIG. 12 is a view of a scheme for the connections of first ports among themselves and of second ports among themselves within each quadruple-feed grouping of FIG. 11 allowing implementation of the coverage coloured in terms of polarization states with a rectangular mesh for the second embodiment of a system according to the invention.

According to FIG. 12, a scheme 392 for the connections of first ports T1 among themselves and of second ports T2 among themselves within each quadruple-feed grouping of the network of FIG. 11 is partially illustrated with, correspondingly, a pavement 394, which is likewise partially illustrated, of the coverage area. This scheme makes it possible to implement a coverage coloured in terms of polarization states P1, P2 and of rectangular coverage mesh for the second embodiment of the system according to the invention.

In this case, four first ports T1, 396, 400, 402, 406, respectively belonging to the feeds 356, 360, 362, 366 of the first grouping Gr1, are connected together to form an elemental surface of a rectangular coverage spot or mesh, which is associated with the transmission resource (F, P1) and denoted by the numerical reference 407.

Four second ports T2, 398, 412, 414, 418, respectively belonging to the feeds 358, 362, 364, 368 of the second grouping Gr2, are connected together to form an elemental surface of a rectangular coverage spot or mesh, which is associated with the transmission resource (F, P2) and denoted by the numerical reference 419.

Four second ports T2, 420, 422, 424, 426, respectively of the feeds 366, 370, 372, 374, are connected together to form an elemental surface of a rectangular coverage spot or mesh, which is associated with the transmission resource (F, P2) and denoted by the numerical reference 427.

These examples of connections can be extended to the other groupings in order to implement the coverage with quadruple points and the plan for reuse of one and the same main band and two polarization states according to the second embodiment of the system according to the invention.

Figure 13:
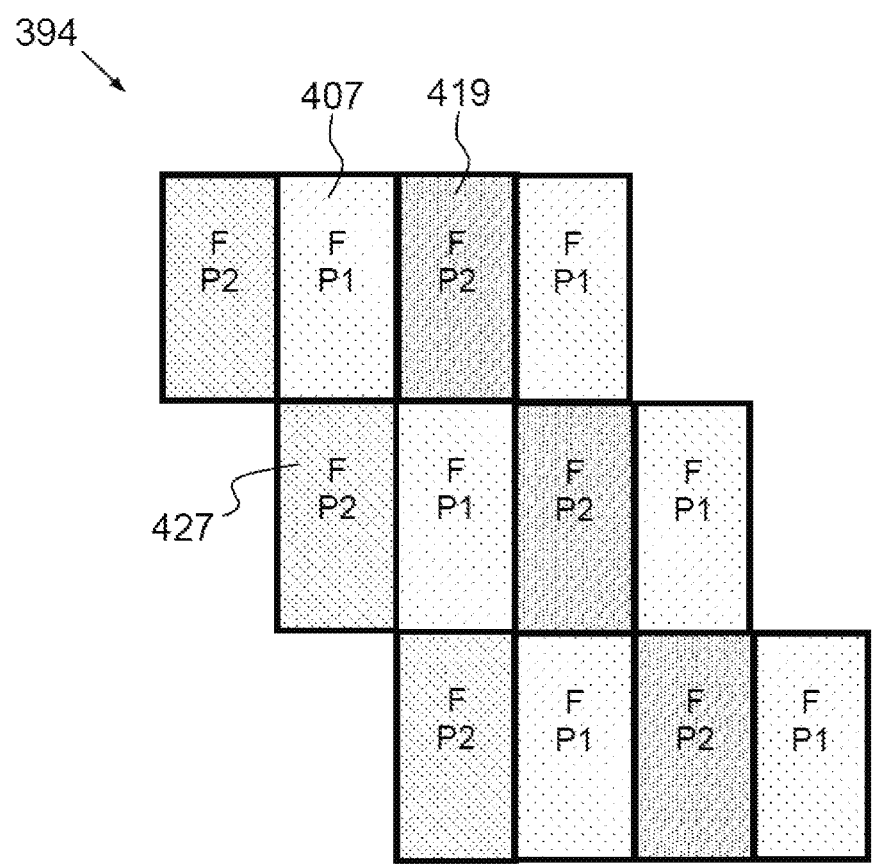
FIG. 13 is a coverage coloured in terms of polarization states with a rectangular mesh for the second embodiment of a system according to the invention implemented by the configuration of the MFPB antenna that is described in FIGS. 11 and 12.

According to FIG. 13, the coverage 394 coloured in terms of polarization states with a rectangular mesh of the second embodiment of the system according to the invention, as implemented by the configuration of the MFPB antenna that is described in FIGS. 11 and 12, is illustrated over a larger geographical extent.

According to a third embodiment of the system according to the invention, a coverage with quadruple points that is coloured in terms of the reuse of one and the same main frequency band BP and two polarization states uses a diamond-shaped coverage mesh.

In order to implement this coloured coverage with a diamond-shaped coverage mesh, the multibeam transmission antenna system has a first transmission antenna and a second multiple feed per beam (MFPB) antenna.

The first transmission antenna has a first main reflector and a first network of multiple feeds illuminating the first main reflector. The second transmission antenna has a second main reflector and a second network of multiple feeds illuminating the second main reflector.

Figure 14:
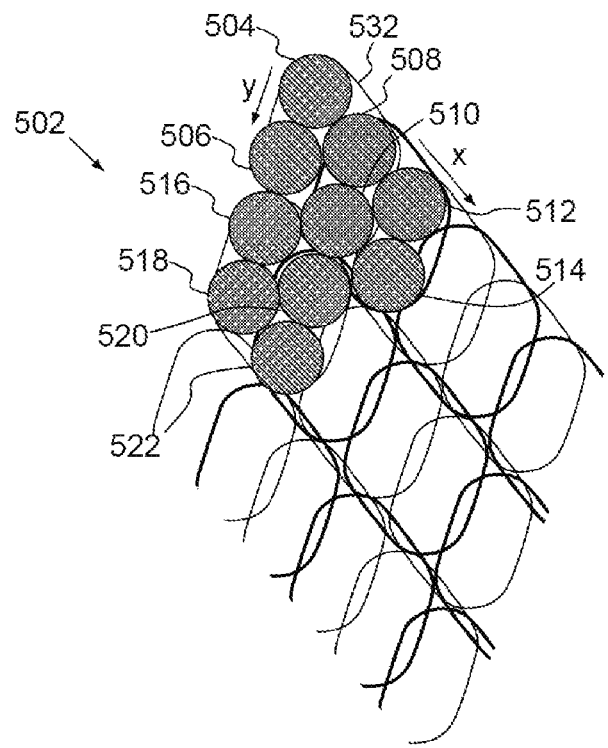
FIG. 14 is a view of a second configuration of an MFPB antenna with a hexagonal network mesh and more particularly of its network of feeds and of its groupings into quadruple feeds, which groupings are appropriately connected so as to implement a third embodiment of a system according to the invention in which the coverage mesh is diamond-shaped.

According to FIG. 14 and a second antenna configuration, the first and second networks have an identical architecture according to which the feeds for an antenna network 502 are distributed according to a hexagonal network mesh in a manner associated in multiple groups that are staggered in relation to one another in X and Y directions of a plane, each feed having a radiating element linked to a microwave channel.

In this case, only ten feeds 504, 506, 508, 510, 512, 514, 516, 518, 520, 522 are shown. The feeds are distributed according to a hexagonal antenna network mesh and associated in multiple groups 532, 534, 536, 538 of four feeds, which are staggered in relation to one another in X and Y directions of a plane, each feed having a radiating element linked to a microwave channel. The feeds can have a circular or square aperture.

Two consecutive adjacent groups in the X direction are spaced apart by a first pitch L1 corresponding to a feed in the X direction and share two feeds in common.

Two consecutive adjacent groups in the Y direction are spaced apart by a second pitch L2 corresponding to two feeds in the Y direction and do not share any feed in common.

In this case, in FIG. 14, only the three groupings 532, 534, 536 are explicitly described here.

The first grouping 532, denoted by Grp1, has the feeds 504, 506, 508, 510.

The second grouping 534, denoted by Grp2, has the feeds 508, 510, 512, 514, is adjacent to the first grouping 532, Grp1, and is spaced apart from the latter by the pitch L1 in the X direction. The first and second groupings Grp1, Grp2 share the feeds 508, 510 in common.

The third grouping 536, denoted by Grp3, has the feeds 516, 518, 520, 522, is adjacent to the first grouping 532, Grp1, and is spaced apart from the latter by the pitch L2 in the Y direction. The first and third groupings Grp1, Grp3 do not share any feed in common.

Each feed has a first port T1 and a second transmission port T2 for the same frequency F, with the first polarization P1 for the first port T1 and with the second polarization P2 for the second port, first and second polarizations P1, P2 being orthogonal among themselves, and the frequency F denoting the total frequency band BT in a simplified manner.

For each group of four adjacent feeds, the four first transmission ports T1 or the four second transmission ports T2 corresponding to one and the same couple of frequency and polarization values, (F, P1) or (F, P2), are connected among themselves, the four transmission ports connected among themselves forming a transmission beam.

For the formation of each beam, the links between the transmission ports of a group of four feeds are made by distribution circuits, the distribution circuits dedicated to the formation of different beams being independent among themselves.

The first and second networks of feeds, the first and second main reflectors and the distribution circuits are configured in terms of geometry and connectivity so as to form useful coverage spots distributed in accordance with a diamond-shaped coverage mesh.

Figure 15:
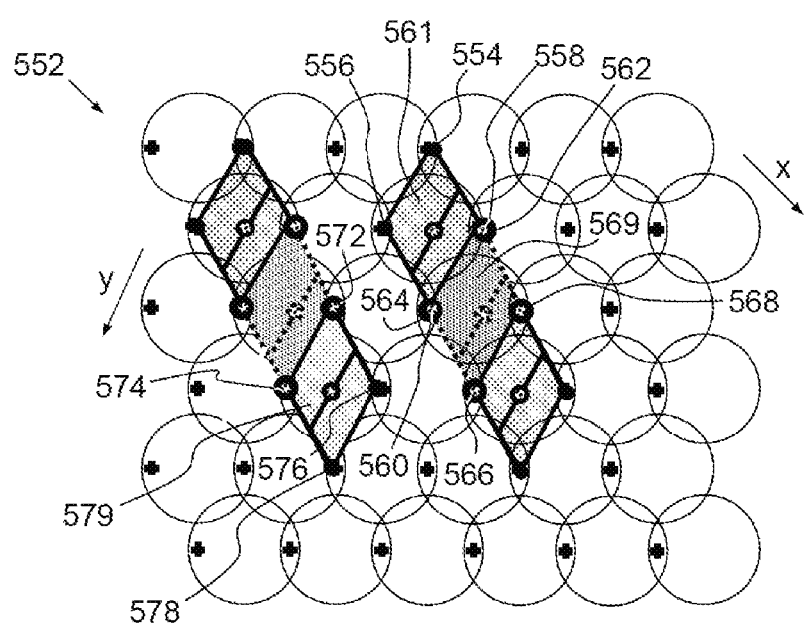
FIG. 15 is a view of a scheme for the connections of first ports among themselves and of second ports among themselves within each quadruple-feed grouping of FIG. 14 allowing implementation of a semi-coverage for the coverage coloured in terms of polarization states with a diamond-shaped mesh for the third embodiment of the system according to the invention.

According to FIG. 15, a scheme 552 for the connections of first ports T1 among themselves and of second ports T2 among themselves within each quadruple-feed grouping of the network 502 of FIG. 14 corresponding to an antenna is partially illustrated with, correspondingly, a pavement 394, which is likewise partially illustrated, of the coverage area. This scheme makes it possible to implement a coverage coloured in terms of polarization states P1, P2 and of rectangular coverage mesh for the second embodiment of the system according to the invention.

In this case, four first ports T1, 554, 556, 558, 560, respectively belonging to the feeds 504, 506, 508, 510 of the first grouping Grp1, are connected together to form an elemental surface of a diamond-shaped coverage spot or mesh, which is associated with the transmission resource (F, P1) and denoted by the numerical reference 561.

Four second ports T2, 562, 564, 566, 568, respectively belonging to the feeds 508, 510, 514, 512 of the second grouping Grp2, are connected together to form an elemental surface of a diamond-shaped coverage spot or mesh, which is associated with the transmission resource (F, P2) and denoted by the numerical reference 569.

Four first ports T2, 572, 574, 576, 578, respectively of the feeds 516, 518, 520, 522, are connected together to form an elemental surface of a rectangular coverage spot or mesh, which is associated with the transmission resource (F, P1) and denoted by the numerical reference 579.

These examples of connections can be extended to the other groupings of each of the two antennas in order to implement for each a semi-coverage of the total coverage with quadruple points in compliance with the plan for reuse of one and the same main band and two polarization states according to the third embodiment of the system according to the invention.

By staggering the first and second antennas in the Y direction by a pitch equal to a feed in the image plane, the antenna system providing the total coverage of the system is obtained.

Figure 16:
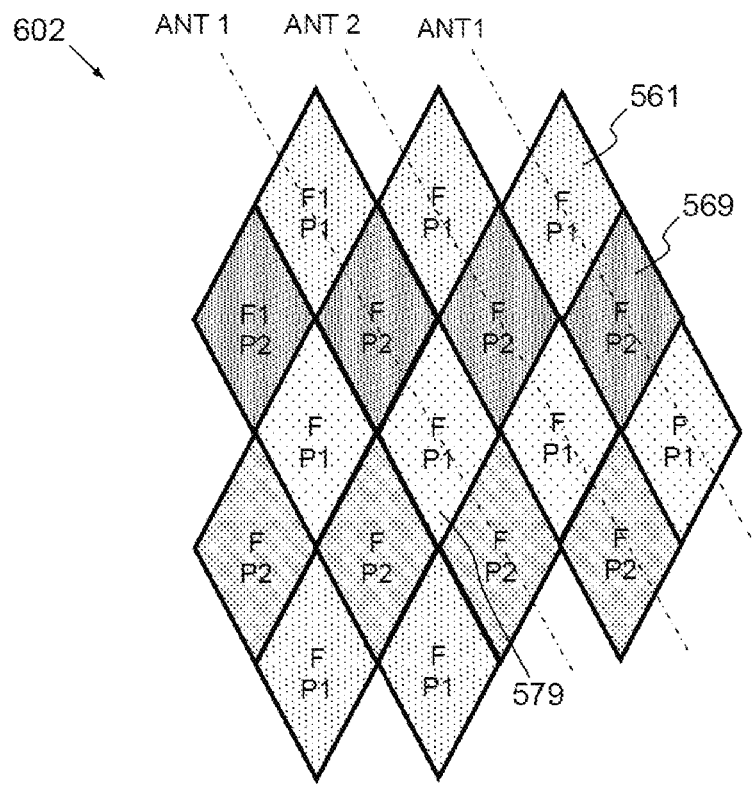
FIG. 16 is a coverage coloured in terms of polarization states with a diamond-shaped mesh for the third embodiment of a system according to the invention implemented by two MFPB antennas that are staggered among themselves and have a configuration as described in FIGS. 14 and 15.

According to FIG. 16, the total coverage 602 coloured in terms of polarization states with diamond-shaped mesh of the third embodiment of the system according to the invention, which is implemented by the configuration of the MFPB antennas of the antenna system that is described in FIGS. 14 and 15, is illustrated over a larger geographical extent particularly integrating the diamond-shaped coverage meshes 561, 569, 579 belonging to the first antenna.

Figure 17:
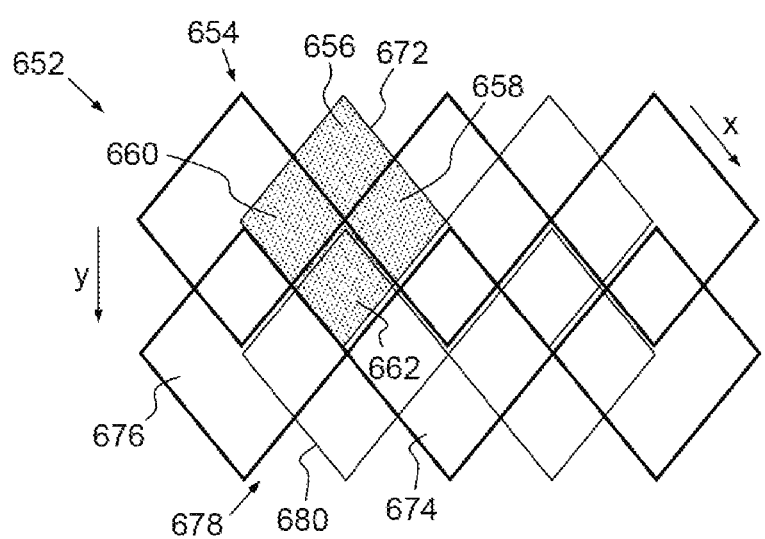
FIG. 17 is a view of a third configuration of an MFPB antenna with a square network mesh and more particularly of its network of feeds and of its groupings into quadruple feeds, which groupings are appropriately connected so as to implement a fourth embodiment of a system according to the invention in which the coverage mesh is square.

According to FIG. 17, a partial view of a third configuration of an MFPB antenna system 652 with a square network mesh and more particularly a view of its network of feeds 654 and of its groupings, into quadruple feeds, that are appropriately connected so as to implement a fourth embodiment of a system according to the invention in which the coverage mesh is square are illustrated.

The multibeam transmission antenna system 652 is implemented by a single multiple feed per beam transmission antenna MFPB that has a main reflector and the network 654 of multiple feeds illuminating the reflector.

In this case, only four feeds 656, 658, 660, 662 are shown. The feeds are distributed according to a square antenna network mesh and associated in multiple groups 672, 674, 676, 678, 680 of four feeds, which are staggered in relation to one another in X and Y directions of a plane that are orthogonal among themselves, each feed having a radiating element linked to a microwave channel. The radiating aperture of the radiating element of each feed has a square shape.

Two consecutive adjacent groups in the X direction are spaced apart by a first pitch L1 corresponding to a feed in the X direction and share a feed in common. Two consecutive adjacent groups in the Y direction are spaced apart by a second pitch L2 corresponding to a feed in the Y direction and share a feed in common.

In this case, in FIG. 17, only the grouping 672, which has the feeds 656, 658, 660, 662, are explicitly described here.

Each feed has a first port T1 and a second transmission port T2 for the same frequency F, with the first polarization P1 for the first port T1 and with the second polarization P2 for the second port, the first and second polarizations P1, P2 being orthogonal among themselves, and the frequency F denoting the total frequency band BT in a simplified manner.

For each group of four adjacent feeds, four first transmission ports T1 or the four second transmission ports T2 corresponding to one and the same couple of frequency and polarization values, (F, P1) or (F, P2), are connected among themselves, the four transmission ports connected among themselves forming a transmission beam.

For the formation of each beam, the links between the transmission ports of a group of four feeds are made by distribution circuits, the distribution circuits dedicated to the formation of different beams being independent among themselves.

The network of feeds, the reflector and the distribution circuits are configured in terms of geometry and connectivity so as to form elemental useful surfaces of spots distributed in accordance with a square coverage mesh.

In this case, for each group 672, 674, 676, 678, the first ports of the respective feeds of which they are composed are connected among themselves in order to radiate the electromagnetic resource associated with the couple (F, P2). For example, the first ports of the feeds 656, 658, 660, 662 are connected among themselves.

The second ports of the four feeds, forming the group 480 and respectively shared with the groups 672, 674, 676, 678, are connected among themselves.

Figure 18:
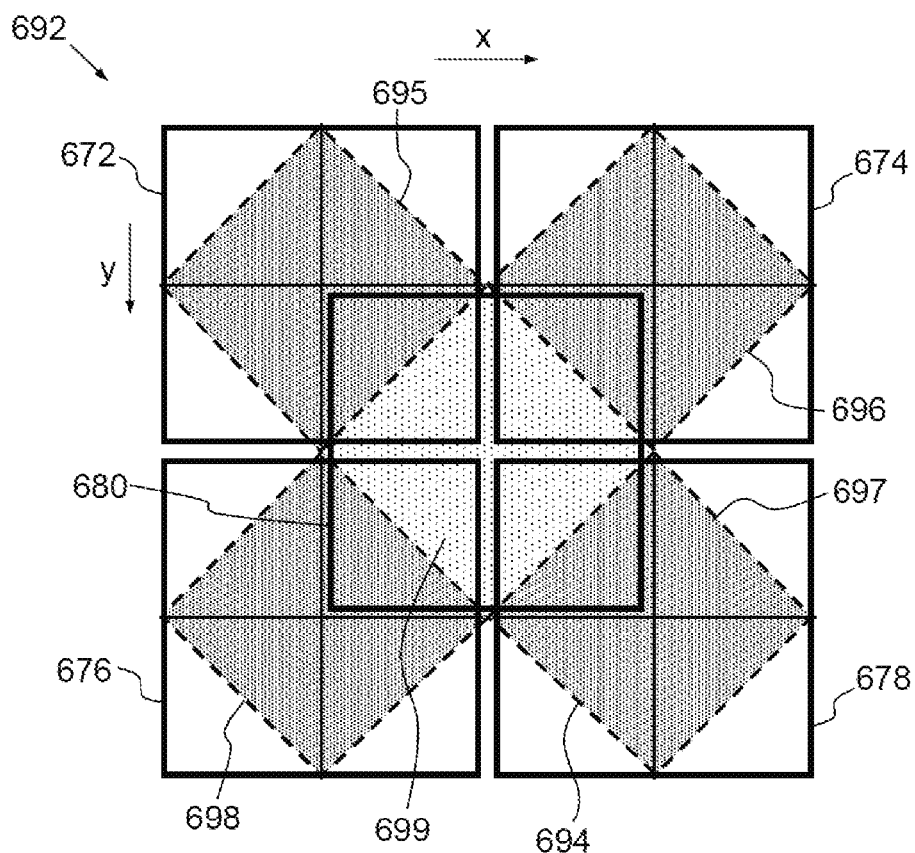
FIG. 18 is a coverage coloured in terms of polarization states with a square mesh for the fourth embodiment of the system according to the invention implemented by the third configuration of the MFPB antenna that is described in FIG. 17.

According to FIG. 18, the coverage 692 coloured in terms of polarization states with a square mesh of the fourth embodiment of the system according to the invention, which is implemented by the third configuration of the MFPB antenna that is described in FIG. 17, is illustrated partially by the partial coverage 494.

The partial coverage 694 in the form of a cross comprises four square elemental useful surfaces 695, 696, 697, 698 that are each associated with the resource couple (F, P2), which surround the square elemental useful surface 699 associated with the couple (F, P1). The square elemental useful surfaces 695, 696, 697, 698, 699 are respectively formed and radiated by the groups of feeds 672, 674, 678, 676 and 680.

The partial coverage 694 naturally extends to the total coverage 692, coloured in terms of polarization states in the form of a draughtboard.

Generally, the forward channel transmission resource planner and allocator is configured to assign to a transmitting terminal, when it so demands, a forward channel transmission resource in terms of a frequency sub-band and a polarization on the basis of the geographical position of the transmitting terminal and a transmission resource allocation plan.

In the case of insufficient control of the attitude of the platform of the satellite being able to cause debilitating depointing of the reception antenna of the satellite, an automatic system for correcting the depointing of the reception antenna will be able to be used.

The geographical positioning means of each transmitting terminal is sufficiently precise to determine the reception spot in which it is located, whether it is located in an internal area or in a peripheral area of the spot. The geographical positioning means is a receiver of a global satellite position system, for example. It may likewise be a receiver at the power levels of predetermined internal channels of the radio communication system that, when reported to a ground station of the radio communication system, will allow said ground station to determine the geographical position of the receiver.

Allocation scheme variants are possible on the basis of the local variability of the traffic, translated into local traffic density, and of the temporal dynamics of the traffic on the coverage. By way of example, in a first case, the size of the central internal area, which is representative of a scale factor, varies on the basis of the reception spot and time. In a second case, the size of the central area varies on the basis of the reception spot and is independent of time. In a third case, the size of the central area is constant, independently of the reception spot and of time.

Figure 19:
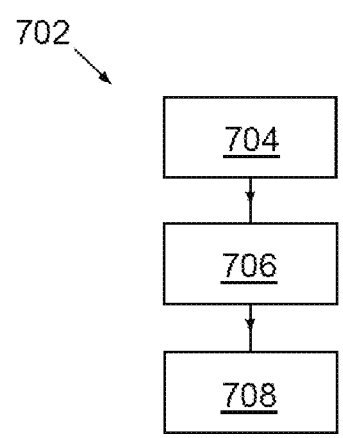
FIG. 19 is a flowchart for a method for reuse of frequencies and polarizations with two states implemented by the various embodiments of the system according to the invention.

According to FIG. 19, a method 702 for complete or fractional reuse of resources of a total band BT allocated to a forward channel is implemented in a satellite radio communication system such as the one described in FIGS. 1 to 18.

The satellite radio communication system comprises a satellite having a multibeam transmission antenna system configured to cover a geographical coverage that is broken down into a plurality of transmission spots, and a set of transmitting terminals that are distributed over all of the spots, each terminal comprising a geographical positioning means.

The satellite radio communication system likewise comprises a forward channel transmission resource planner and allocator.

The method 702 comprises a set of successively executed steps.

In a first step 704, a forward channel transmission resource allocation plan is determined according to which each transmission spot is made up of a central internal area and a peripheral area surrounding the central internal area. Moreover, according to the plan for reuse, the first polarization state P1 and the second polarization state P2 are respectively allocated to the spots of the first grid G1 and to the spots of the second grid G2. One and the same main band BP of frequencies in one piece or in multiple pieces, forming a dominant part of the total band BT in terms of occupied band, is likewise allocated wholly to each central internal area of the spots of the first and second grids. The frequencies of the total band BT that are not part of the main band BP form a secondary band BS in one piece or in multiple pieces that is broken down into an integral number n, greater than or equal to 2, of secondary sub-bands in one piece that are each, separately or adjacently, distributed over all of the peripheral areas of the transmission spots according to a multicoloured scheme with n colours of secondary sub-bands.

The points of intersection between the spots of the first and second grids are quadruple points, that is to say having an order of multiplicity equal to 4.

The quadruple points define elemental useful coverage surfaces at the rate of one per spot that form a pavement of the coverage area.

Each elemental useful surface constitutes a mesh of the pavement having the shape of a parallelogram.

Each internal area is inscribed in an elemental useful surface.

Next, in a second step 706, for each receiving terminal that wishes to have a transmission resource, the transmission spot in which the receiving terminal is located is determined, and whether it is located in an internal area or in a peripheral area.

Then, in a third step 708, the forward channel transmission resource planner and allocator assigns to a receiving terminal, when it so demands, a forward channel transmission resource in terms of a frequency sub-band of the total band BT and a polarization state taken from among a first polarization state P1 and a second polarization state P2 on the basis of the geographical position of the receiving terminal.

When the receiving terminal is located in an internal area, the terminal is allocated a transmission resource of the main band and of the polarization state that have been assigned by the reuse plan to the internal area of the transmission spot in which the terminal is located.

When the receiving terminal is located in a peripheral area, the terminal is allocated a transmission resource of the auxiliary sub-band and the polarization state that have been assigned to the peripheral area of the transmission spot in which the terminal is located.

As variants, the size of the central area varies on the basis of the transmission spot and time, or the size of the central area varies on the basis of the transmission spot and is independent of time.

The satellite radio communication system and the method for reuse of frequencies are configured for reception of the return channel by the satellite in a band included in the set of bands C, X, Ku, Ka, L, S, Q and V.

Static planning of the cell pattern corresponds to an optimum for a system at maximum load.

When the systems are not at 100% load, dynamic planning on a C/I criterion can be envisaged, notwithstanding that an optimum at a given instant is not necessarily consistent with the following instant and leads to complexity in the management of planning.

The methods for reuse of frequencies and polarizations using coverage with quadruple points as are described above allow an increase in the transmission capacity of a satellite but also in the capacity density, that is to say the bit rate that can be addressed by surface unit.

The invention claimed is:

1. A broadband multibeam satellite radio communication system, configured for fractional reuse of frequencies of a total band BT allocated to a forward channel, comprising:
a satellite having a multibeam transmission antenna system, configured to cover a geographical service area that is broken down into a plurality of transmission spots, having a first grid G1 of spots and a second grid G2 of transmission spots, the transmission spots of the first grid G1 and the transmission spots of the second grid G2 being positioned and their radiation patterns being configured such that there are points of intersection between the roll-off isocontours of an integral number m, greater than or equal to three, of partially overlapping adjacent spots, the number m denoting the order of multiplicity of the points of intersection; and
a set of receiving terminals that are distributed over all of the transmission spots, each receiving terminal comprising a geographical positioning means and a reception means according to an allocated transmission resource;
a forward channel transmission resource planner and allocator, which is implemented in the form of one or more electronic computers and configured to assign to a receiving terminal, when it so demands, a forward channel transmission resource in terms of a frequency sub-band of the total band BT and of a polarization state taken from among a first polarization state P1 and a second polarization state P2 on the basis of the geographical position of the receiving terminal and a forward channel transmission resource allocation plan according to which each transmission spot is made up of a central internal area and a peripheral area surrounding the central internal area; and
the first polarization state and the second polarization state are respectively allocated to the spots of the first grid G1 and to the spots of the second grid G2, and one and the same main band BP of frequencies in one piece or in multiple pieces, forming a dominant part of the total band BT in terms of occupied band, is allocated wholly to each central internal area of the spots of the first and second grids; and
the frequencies of the total band BT that are not part of the main band BP form a secondary band BS in one piece or in multiple pieces that is broken down into an integral number n, greater than or equal to 2, of secondary sub-bands in one piece that are each, separately or adjacently, distributed over all of the peripheral areas of the transmission spots according to a multicoloured scheme with n colours of secondary sub-bands,
wherein the points of intersection between the spots of the first and second grids are quadruple points of intersection, having an order of multiplicity equal to 4.

2. The multibeam satellite radio communication system according to claim 1, wherein
the quadruple points define elemental useful coverage surfaces at the rate of one per spot that form a pavement of the coverage area, and
each elemental useful surface constitutes a mesh of the pavement of the same size and of the same shape, and the shape of the mesh is a parallelogram.

3. The multibeam satellite radio communication system according to claim 2, wherein the shape of the mesh is a square or a rectangle or a diamond.

4. The multibeam satellite radio communication system according to claim 1, wherein each internal area is inscribed in the elemental useful surface of its transmission spot.

5. The multibeam satellite radio communication system according to claim 1, wherein the number n of secondary sub-bands is an integer included in the set of numbers 2, 3, 4, 7 and 12, and preferably equal to 2.

6. The multibeam satellite radio communication system according to claim 1, wherein the first and second polarization states are the left circular polarization and the right circular polarization or a first linear polarization according to a first axis and a second linear polarization according to a second axis, which is orthogonal with respect to the first axis.

7. The multibeam satellite radio communication system according to claim 1, wherein the multibeam transmission antenna system has first and second single feed per beam transmission antennas,
the first antenna having a first network of distributed feeds in accordance with a square first network mesh and a first main reflector;
the second antenna having a second network of distributed feeds in accordance with a square second network mesh and a second main reflector; and
the first and second networks of feeds and the first and second main reflectors are geometrically configured so as to form a coverage for the service area with quadruple points and square coverage mesh.

8. The multibeam satellite radio communication system according to claim 1, wherein the multibeam transmission antenna system has a single multiple feed per beam transmission antenna; and
the transmission antenna has a main reflector and a network of multiple feeds illuminating the reflector, the feeds being distributed according to a hexagonal or square antenna network mesh and being associated in multiple groups that are staggered in relation to one another in X and Y directions of a plane, each feed having a radiating element linked to a microwave channel;
each feed has a first port and a second port for transmission of the same frequency and with polarizations that are orthogonal among themselves,
the feeds are associated by groups of four adjacent feeds in X and Y directions;
for each group of four adjacent feeds, the first transmission ports or the second transmission ports corresponding to one and the same couple of frequency and polarization values are connected among themselves, the four transmission ports connected among themselves forming a transmission beam;
for the formation of each beam, the links between the transmission ports of a group of four feeds are implemented by distribution circuits, the distribution circuits dedicated to the formation of different beams being independent among themselves;
the network of feeds, the reflector and the distribution circuits are configured in terms of geometry and connectivity so as to form a total coverage or a semi-coverage for the service area by means of transmission spots distributed in accordance with a coverage mesh that is included among the rectangular, diamond-shaped and square meshes.

9. The multibeam satellite radio communication system according to claim 8, wherein
the mesh of the network of feeds is a hexagonal antenna network mesh and the radiating aperture of the radiating element has a circular or square shape; and
two consecutive adjacent groups in the X direction are spaced apart by a first pitch L1 corresponding to a feed in the X direction and share a feed in common;
two consecutive adjacent groups in the Y direction are spaced apart by a second pitch L2 corresponding to a feed in the Y direction and share a feed in common;
each group of four feeds forming a transmission beam of substantially rectangular or diamond shape for adjustment of the associated distribution circuits.

10. The multibeam satellite radio communication system according to claim 8, wherein
the mesh of the network of feeds is a hexagonal antenna network mesh and the radiating aperture of the radiating element has a circular or square shape; and
two consecutive adjacent groups in the X direction are spaced apart by a first pitch L1 corresponding to a feed in the X direction and share two feeds in common; and two consecutive adjacent groups in the Y direction are spaced apart by a second pitch L2 corresponding to two feeds in the Y direction and do not share any feed in common; and
each group of four feeds forms a transmission beam of substantially diamond or rectangular shape for adjustment of the distribution circuits associated with said group.

11. The multibeam satellite radio communication system according to claim 8, wherein
the mesh of the network of feeds is a square antenna network mesh and the radiating aperture of the radiating element has a square shape; and
the two directions X and Y form a right angle; and
two consecutive adjacent groups in the X direction are spaced apart by a first pitch L1 corresponding to a feed in the X direction and share a feed in common; and two consecutive adjacent groups in the Y direction are spaced apart by a second pitch L2 corresponding to a feed in the Y direction and share a feed in common; and
each group of four feeds forms a transmission beam of substantially square shape for adjustment of the distribution circuits associated with said group; and
the network of feeds, the reflector and the distribution circuits are configured in terms of geometry and connectivity so as to form a total coverage for the service area by means of transmission spots distributed in accordance with a square coverage mesh.

12. The multibeam satellite radio communication system according to claim 1, wherein the multibeam transmission antenna system has a first transmission antenna and a second multiple feed per beam antenna; and
the first transmission antenna has a first main reflector and a first network of multiple feeds illuminating the first main reflector;
the second transmission antenna has a second main reflector and a second network of multiple feeds illuminating the second main reflector;
the first and second networks have an identical architecture in accordance with which the feeds for an antenna network are distributed according to a hexagonal network mesh in a manner associated in multiple groups that are staggered in relation to one another in X and Y directions of a plane, each feed having a radiating element linked to a microwave channel;
each feed has a first port and a second port for transmission of the same frequency and with polarizations that are orthogonal among themselves;
the feeds are associated by groups of four adjacent feeds in the X and Y directions;
for each group of four adjacent feeds, the first transmission ports corresponding to one and the same couple of frequency and polarization values are connected two by two in the X direction and then two by two in the Y direction, the four transmission ports connected among themselves forming a transmission beam;
for the formation of each beam, the links between the transmission ports of a group of four feeds are implemented by distribution circuits, the distribution circuits dedicated to the formation of different beams being independent among themselves;

the first and second networks of feeds, the first and second main reflectors and the distribution circuits are configured in terms of geometry and connectivity so as to form a total coverage for the service area by means of transmission spots distributed in accordance with a rectangular or diamond-shaped coverage mesh.

13. The multibeam satellite radio communication system according to claim 12, wherein the mesh of the first network of feeds and of the second network of feeds is a hexagonal antenna network mesh and the radiating aperture of the radiating element of each feed has one and the same circular or square shape; and for each network:

two consecutive adjacent groups in the X direction are spaced apart by a first pitch L1 corresponding to a feed in the X direction and share two feeds in common;

two consecutive adjacent groups in the Y direction are spaced apart by a second pitch L2 corresponding to two feeds in the Y direction and do not share any feed in common;

each group of four feeds forming a transmission beam of substantially diamond shape for adjustment of the associated distribution circuits.

14. The multibeam satellite radio communication system according to claim 12, wherein the mesh of the first network of feeds and of the second network of feeds is a hexagonal antenna network mesh and the radiating aperture of the radiating element of each feed has one and the same circular or square shape; and for each network:

two consecutive adjacent groups in the X direction are spaced apart by a first pitch L1 corresponding to a feed in the X direction and share a feed in common; and two consecutive adjacent groups in the Y direction are spaced apart by a second pitch L2 corresponding to a feed in the Y direction and share a feed in common; and each group of four feeds forms a transmission beam of substantially rectangular shape for adjustment of the distribution circuits associated with said group.

15. The multibeam satellite radio communication system according to claim 1, wherein the satellite is configured to radiate in each spot and over the whole extent thereof, including its central area and its peripheral area, a transmitted colour of transmission resources that is formed by the main frequency band, by the secondary band and by the polarization state that are allocated to said spot by the frequency and polarization state plan.

16. The multibeam satellite radio communication system according to claim 1, further comprising an automatic system for correcting the depointing of the antenna caused notably by variations in attitude of the platform of the satellite.

17. The multibeam satellite radio communication system according to claim 1, further comprising:

a set of receiving terminals that are distributed over all of the spots, and each terminal comprises a geographical positioning means that is sufficiently precise to determine the transmission spot in which it is located, and whether it is located in an internal area or in a peripheral area of said transmission spot.

18. The multibeam satellite radio communication system according to claim 1, wherein the forward channel transmission resource planner and allocator is distributed over all of the terminals and/or of one or more auxiliary stations or is in centralized form in a station for controlling the resources and for planning therefor.

19. The multibeam satellite radio communication system according to claim 1, wherein the size of the central area varies on the basis of the transmission spot and time, or the size of the central area varies on the basis of the transmission spot and is independent of time or the size of the central area is constant independently of the transmission spot and time.

20. The multibeam satellite radio communication system according to claim 1, configured for transmission of the forward channel by the satellite in a band included in all of the bands C, X, Ku, Ka, L, S, Q and V.

21. A method for complete or fractional reuse of frequencies of a total band allocated to a forward channel in a broadband multibeam satellite radio communication system, the system comprising:

a satellite having a multibeam transmission antenna system configured to cover a geographical service area that is broken down into a plurality of transmission spots, having a first grid G1 of spots and a second grid G2 of transmission spots, the transmission spots of the first grid G1 and the transmission spots of the second grid G2 being positioned and their radiation patterns being configured such that there are points of intersection between the roll-off isocontours of an integral number m, greater than or equal to three, of partially overlapping adjacent spots, the number m denoting the order of multiplicity of the points of intersection; and a set of receiving terminals that are distributed over all of the transmission spots, each receiving terminal comprising a geographical positioning means and a reception means according to an allocated transmission resource; and a forward channel transmission resource planner and allocator, implemented in the form of one or more electronic computers;

the method comprising the steps of:

determining a forward channel transmission resource allocation plan according to which each transmission spot is made up of a central internal area and a peripheral area surrounding the central internal area; and the first polarization state and the second polarization state are respectively allocated to the spots of the first grid G1 and to the spots of the second grid G2, and one and the same main band BP of frequencies in one piece or in multiple pieces, forming a dominant part of the total band BT in terms of occupied band, is allocated wholly to each central internal area of the spots of the first and second grids; and the frequencies of the total band BT that are not part of the main band BP form a secondary band BS in one piece or in multiple pieces that is broken down into an integral number n, greater than or equal to 2, of secondary sub-bands in one piece that are each, separately or adjacently, distributed over all of the peripheral areas of the transmission spots according to a multicoloured scheme with n colours of secondary sub-bands, assigning to a receiving terminal, when it so demands, a forward channel transmission resource in terms of a frequency sub-band of the total band BT and of a polarization state taken from among a first polarization state P1 and a second polarization state P2 on the basis of the geographical position of the receiving terminal, wherein the points of intersection between the spots of the first and second grids are quadruple points, having an order of multiplicity equal to 4; and the quadruple points define elemental useful coverage surfaces at the rate of one per spot that form a pavement of the coverage area, and each elemental useful surface constitutes a mesh of the pavement having the shape of a parallelogram, and each internal area is inscribed in an elemental useful surface.

22. The method for reuse of frequency according to claim 21, further comprising the steps consisting in:

for each terminal that wishes to have a transmission resource, determining the transmission spot in which it is located and whether it is located in an internal area or in a peripheral area, then when the terminal is located in an internal area, allocating to the terminal a transmission resource of the main band and of the polarization state that have been assigned to the internal area of the transmission spot in which the terminal is located, or when the terminal is located in a peripheral area, allocating to the terminal a transmission resource of the auxiliary sub-band and the polarization state that have been assigned to the peripheral area of the transmission spot in which the terminal is located.

23. The method for reuse of frequency according to claim 21, wherein the size of the central area varies on the basis of the transmission spot and time, or the size of the central area varies on the basis of the transmission spot and is independent of time or the size of the central area is constant independently of the transmission spot and time.

* * * * *